(12) United States Patent
Kozuma et al.

(10) Patent No.: US 8,127,998 B2
(45) Date of Patent: Mar. 6, 2012

(54) SEMICONDUCTOR DEVICE

(75) Inventors: Munehiro Kozuma, Atsugi (JP);
Yoshiyuki Kurokawa, Sagamihara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 746 days.

(21) Appl. No.: 12/230,286

(22) Filed: Aug. 27, 2008

(65) Prior Publication Data
US 2009/0057418 A1 Mar. 5, 2009

(30) Foreign Application Priority Data

Aug. 30, 2007 (JP) ................................. 2007-223644

(51) Int. Cl.
*G06K 19/06* (2006.01)
(52) U.S. Cl. ........................................ 235/492; 235/487
(58) Field of Classification Search .................. 324/763
See application file for complete search history.

(56) References Cited

U.S. PATENT DOCUMENTS

| | | | |
|---|---|---|---|
| 6,798,274 | B2 | 9/2004 | Tanimoto |
| 2002/0149482 | A1 | 10/2002 | Shanks et al. |
| 2003/0189483 | A1* | 10/2003 | Saitoh et al. ................. 340/10.1 |
| 2004/0190361 | A1* | 9/2004 | Tokui et al. ................... 365/226 |
| 2004/0207527 | A1 | 10/2004 | Shanks et al. |
| 2005/0133605 | A1 | 6/2005 | Koyama et al. |
| 2007/0102517 | A1 | 5/2007 | Minami et al. |
| 2007/0146055 | A1 | 6/2007 | Iwabuchi et al. |
| 2007/0273415 | A1* | 11/2007 | Kimura et al. ................. 327/157 |
| 2008/0049884 | A1* | 2/2008 | Kim et al. ...................... 375/375 |
| 2008/0093934 | A1 | 4/2008 | Kato |
| 2008/0093935 | A1 | 4/2008 | Saito et al. |
| 2009/0045832 | A1* | 2/2009 | Brandl et al. ................. 324/763 |

FOREIGN PATENT DOCUMENTS

| | | |
|---|---|---|
| JP | 2003-088103 | 3/2003 |
| JP | 2003-289663 | 10/2003 |
| JP | 2007-043568 | 2/2007 |

OTHER PUBLICATIONS

Search Report (Application No. 08015142.6) dated Dec. 15, 2009.

* cited by examiner

*Primary Examiner* — Thien M. Le
*Assistant Examiner* — Sonji Johnson
(74) *Attorney, Agent, or Firm* — Eric J. Robinson; Robinson Intellectual Property Law Office, P.C.

(57) ABSTRACT

A semiconductor device is provided, which includes an antenna, a first circuit (a boosting circuit), a second circuit (a reference voltage supply circuit), and a third circuit (a voltage comparison circuit). The first circuit is electrically connected to the antenna, and includes at least a first charge pump, a second charge pump, and a first switch disposed between the first charge pump and the second charge pump. The second circuit is configured to generate a reference voltage in accordance with a first output voltage supplied from the first charge pump. The third circuit is configured to compare the reference voltage, the first output voltage, and a second output voltage supplied from the second charge pump.

16 Claims, 16 Drawing Sheets

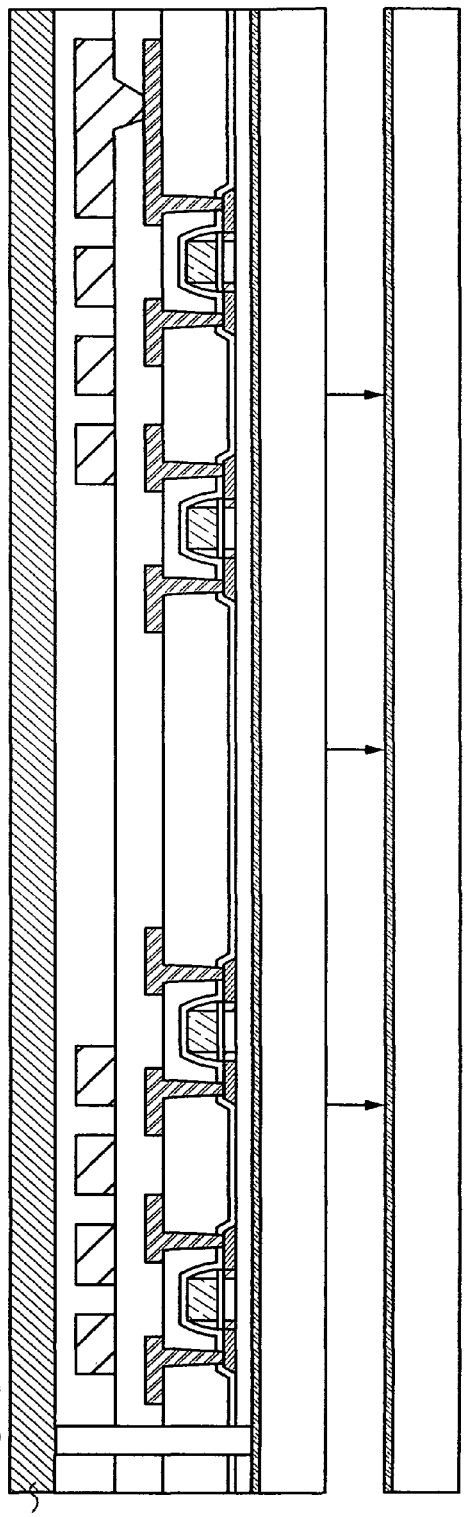
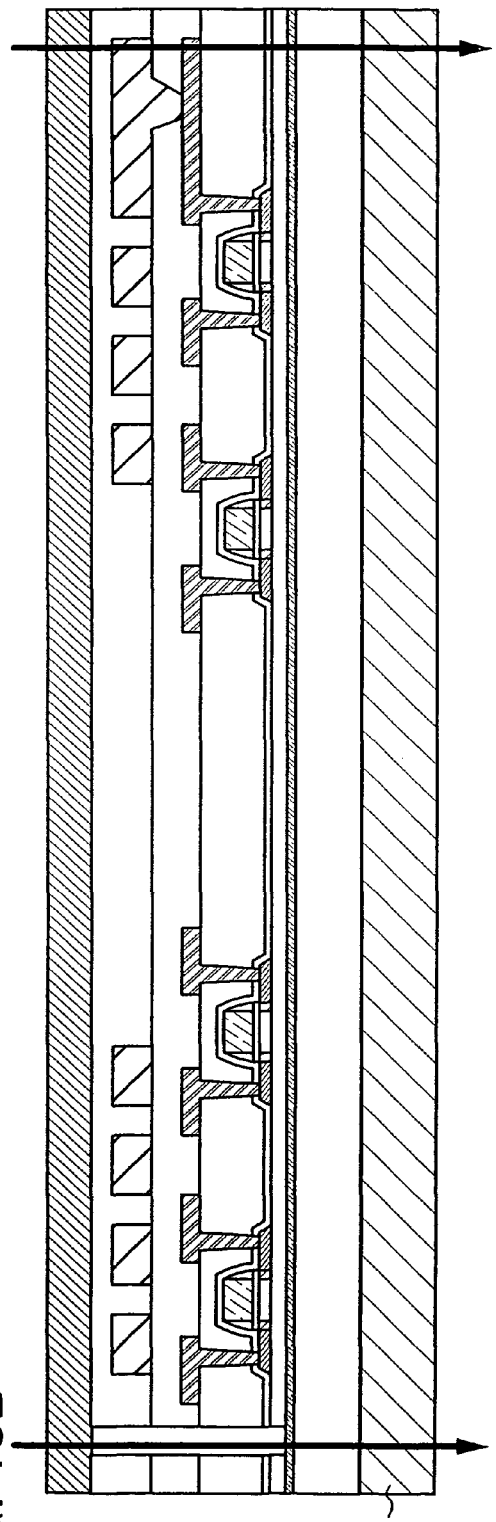
FIG. 13A  1920
FIG. 13B  1921

SEMICONDUCTOR DEVICE

BACKGROUND OF THE INVENTION

1. Field of the Invention

The present invention relates to a semiconductor device. The present invention particularly relates to a semiconductor device capable of wireless data communication, a so-called IC chip (also referred to as an ID chip or a transponder) for RFID (radio frequency identification).

Note that the semiconductor device herein means all devices that can function by utilizing the semiconductor characteristics.

2. Description of the Related Art

In recent years, as it is called ubiquitous information society, an environment which is capable of accessing to an information network anytime and anywhere has been put into place. In such environment, an individual identification technique in which an ID (individual identification number) is given to an individual object to clarify records of the object so that it is useful for production, management, and the like has been researched for practical use. In particular, semiconductor devices which utilize an RFID (radio frequency identification) technique and performs wireless data communication with external communication devices (hereinafter referred to as communication devices, and also referred to as reader/writers, controllers, and interrogators) have become widely used. Such semiconductor devices are hereinafter simply referred to as semiconductor devices and also referred to as ID chips, IC chips, and transponders.

A semiconductor device receives a wireless signal transmitted from a communication device by an antenna. The antenna generates a signal of AC voltage (hereinafter referred to as an AC signal) by receiving the wireless signal. The AC signal is converted into a signal of DC voltage (hereinafter referred to as a DC signal) by a rectifier circuit which performs rectification. The DC signal is input to a constant voltage circuit (also referred to as a regulator or a power supply circuit) so that a power supply voltage Vdd is generated. The power supply voltage Vdd generated in the constant voltage circuit is applied to a plurality of circuits included in the semiconductor device.

In Patent Document 1 (Japanese Published Patent Application No. 2007-43568), a structure is disclosed in which, in order to increase energy efficiency of a wireless signal to be received by an antenna, a voltage of a DC signal is boosted by a boosting circuit with a charge pump, and the DC signal is supplied to an RF transmission circuit after electric power is accumulated in a charging/discharging circuit.

SUMMARY OF THE INVENTION

A semiconductor device includes a capacitor element to store charge generated by receiving a wireless signal by an antenna. The structure of the semiconductor device including the capacitor element is effective for stabilizing power supply and accumulating electric power. In the case where the capacitor element is used for stabilizing the power supply, the area or a holding voltage of the capacitor element is necessary to be increased in order to increase the amount of charge to be stored. When the capacitor element is actually incorporated in the semiconductor device, to manufacture the capacitor element with an area as small as possible can achieve advantages in cost, usage and power consumption. A method in which voltage is boosted by a charge pump in order to increase the amount of charge to be stored and charge is stored in the capacitor element at a high voltage can be used.

The boosting circuit with the charge pump disclosed in Patent Document 1 outputs a voltage at a last stage in the boosting circuit. Thus, when electric power to be input to the boosting circuit is determined, an output voltage is uniquely determined. However, a relation between an input voltage and an output voltage which is uniquely determined by the input voltage is hard to be dealt with for the semiconductor device in which an input voltage is variable. When a distance r between the semiconductor device and a reader/writer changes, electric power P supplied from a communication device changes by approximately $P \propto 1/r^4$. The semiconductor device that is capable of wireless data communication is different from general electronic devices. The semiconductor device that is capable of wireless data communication is used not in an environment in which constant electric power is supplied, but mainly in an environment in which electric power supply is varied depending on a communication distance.

The semiconductor device determines a power supply voltage generated in a circuit counting on electric power supply. When the distance between the communication device and the semiconductor device is short, a voltage generated and supplied to a power supply circuit is increased. On the other hand, as the distance between the communication device and the semiconductor device becomes long, the voltage generated and supplied to the power supply circuit is decreased. In this manner, a voltage generated in the semiconductor device has a variation depending on the distance between the semiconductor device and the communication device. In general, since an output of the boosting circuit is provided only at the end stage, an output voltage is uniquely determined with respect to a given input electric power. An object of this invention is to provide a semiconductor device that includes a boosting circuit with a charge pump for efficiently using electric power supplied and can operate even if the communication distance between the communication device and the semiconductor device becomes long.

In this invention, a semiconductor device including a boosting circuit having a plurality of charge pumps for efficiently using electric power supplied is provided with a structure that adjusts an output stage of the boosting circuit. In specific, the semiconductor device of this invention includes an antenna, a plurality of charge pumps each having a diode and a capacitor element, a boosting circuit having a switch provided between the charge pumps, a reference voltage supply circuit which generates a reference voltage, and a voltage comparison circuit having a comparator. An output voltage from each of the plurality of charge pumps included in the boosting circuit is compared with the reference voltage by using the comparator. On the basis of a magnitude relation between the reference voltage and the output voltage from each of the plurality of charge pumps included in the boosting circuit, on/off of the switch of the boosting circuit are switched to control output in accordance with an output signal of the comparator.

The semiconductor device of this invention includes a boosting circuit with a charge pump for efficiently using electric power supplied so that the semiconductor device of this invention can operate even if a communication distance with a communication device becomes long. When boosting is completed with the small number of stages of the charge pumps in the boosting circuit, a stage that follows a stage of the charge pumps used for predetermined boosting is not used. Since the boosting circuit does not boost a voltage to be higher than a required output voltage, a loss of electric power for boosting operation can be kept to the minimum in the boosting circuit. Therefore, the boosting circuit can be optimized and electric power consumption can be reduced.

BRIEF DESCRIPTION OF THE DRAWINGS

In the accompanying drawings:

FIGS. 13A and 13B are diagrams for describing Embodiment Mode 2.

DETAILED DESCRIPTION OF THE INVENTION

Hereinafter, embodiment modes of this invention will be described in detail. However, this invention is not limited to the following description, and it is to be easily understood that various changes and modifications will be apparent to those skilled in the art without departing from the scope of the invention. Therefore, this invention should not be limited to the descriptions of the embodiment modes below.

Embodiment Mode 1

The structure of a semiconductor device of this invention is described with reference to a block diagram shown in FIG. 1. Note that in this embodiment mode, the case is described in which the semiconductor device of this invention is used as a semiconductor device capable of wireless data communication, a so-called IC chip (also referred to as an ID chip, an IC chip, or a transponder) for RFID (radio frequency identification).

Figure 1:
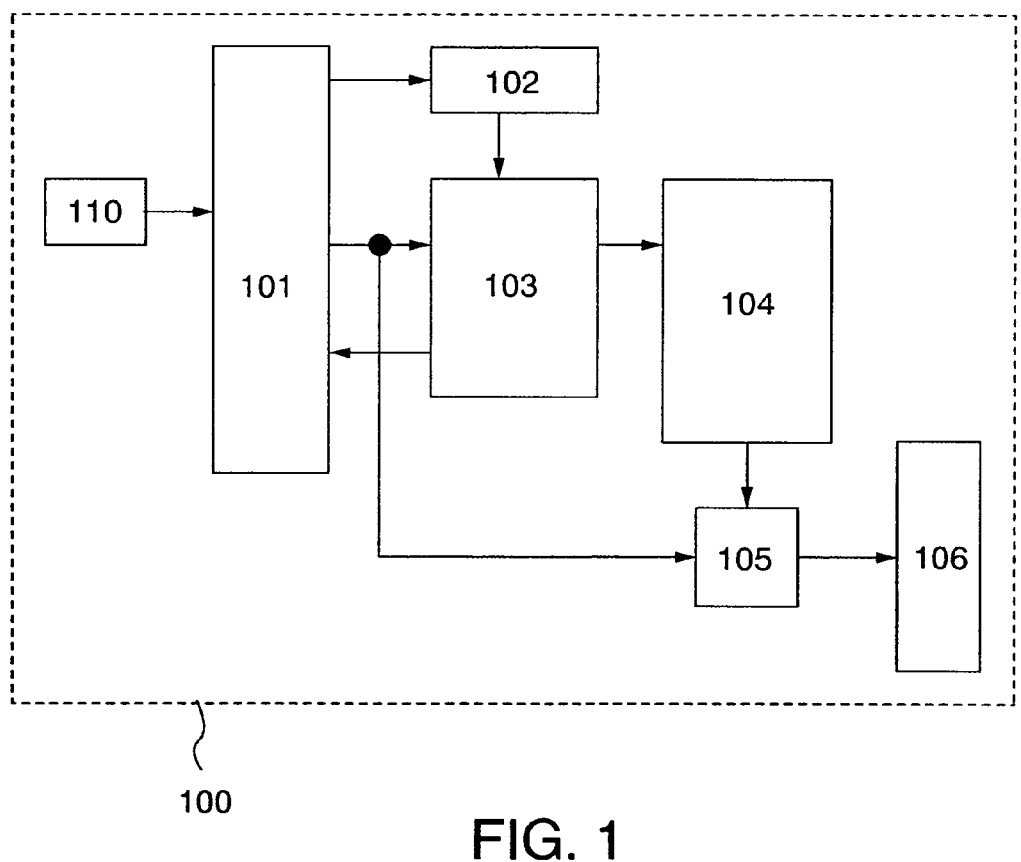
FIG. 1 is a diagram for describing Embodiment Mode 1.

A semiconductor device 100 shown in FIG. 1 includes an antenna 110, a boosting circuit 101, a reference voltage supply circuit 102, a voltage comparison circuit 103, a switch controller 104, an output changeover switch 105, and a logic circuit 106.

The semiconductor device shown in FIG. 1 transmits and receives signals and receives radio waves that serve as electric power source by the antenna 110. The boosting circuit 101 has a function of generating a voltage from the radio wave received and generating a voltage higher than a power supply voltage of the semiconductor device. The reference voltage supply circuit 102 is a circuit for obtaining a constant output voltage by stepping down an input voltage and has a function of generating a reference voltage to be input to the voltage comparison circuit 103. The voltage comparison circuit 103 has a function of comparing the reference voltage generated in the reference voltage supply circuit 102 and a voltage based on an output voltage from each of a plurality of charge pumps included in the boosting circuit 101 and generating a logic signal (also referred to as an output signal) which is a result from comparison of voltages, and a function of controlling on/off of a switch provided in the boosting circuit 101. The switch controller 104 has a function of outputting a control signal for controlling on/off of the output changeover switch 105 on the basis of the logic signal which is the result from comparison in the voltage comparison circuit 103. The output changeover switch 105 includes a plurality of switches, and on/off of which switch is controlled in accordance with the control signal output from the switch controller 104. The same number of switches as that of the plurality of charge pumps included in the boosting circuit 101 is required for the output changeover switch 105. The output voltage of the boosting circuit 101 which is selected by the output changeover switch 105 is supplied to the logic circuit 106. The logic circuit 106 may have any structure as long as it functions as a semiconductor device; for example, a structure including a demodulation circuit, a modulation circuit, a CPU (central processing unit), a ROM (read only memory), and a RAM (random access memory) may be employed. In operation of the logic circuit 106, the signal received by the antenna 110 is boosted by the boosting circuit 101. The boosted signal is demodulated by a demodulation circuit in the logic circuit and a CPU, a ROM, and a RAM performs arithmetic processing or reading-out in accordance with data corresponding to a command. The data subjected to the arithmetic processing or read out by the CPU, the ROM, and the RAM is demodulated in the demodulation circuit and is transmitted to the communication device by the antenna 110.

Note that there are no particular limitations on the shape of the antenna 110 in FIG. 1. Therefore, as a transmission method of a signal that can be applied to the antenna 110 in the semiconductor device 100, an electromagnetic coupling method, an electromagnetic induction method, a microwave method, or the like can be employed. A practitioner may select a transmission method in consideration of use as appropriate and an antenna with an appropriate length and shape with respect to the transmission method is provided.

For example, when an electromagnetic coupling method or an electromagnetic induction method (e.g., 13.56 MHz band) is employed as the transmission method, a conductive film which functions as an antenna is formed into a circular shape (e.g., a loop antenna) or a spiral shape (e.g., a spiral antenna) to utilize electromagnetic induction due to changes in electric field density.

Further, when a microwave method (e.g., a UHF band (860 to 960 MHz band), a 2.45 GHz band, or the like) is employed as the transmission method, the length or the shape of the conductive film functioning as the antenna may be set as appropriate in consideration of a wavelength of a radio wave used for signal transmission. For example, the conductive film functioning as the antenna can be formed into a linear shape (e.g., a dipole antenna), a flat shape (e.g., a patch antenna), or the like. The shape of the conductive film functioning as an antenna is not limited to a linear shape but may be a curved shape, a meandering shape, or a combination thereof in consideration of the wavelength of an electromagnetic wave.

Note that the semiconductor device and the communication device communicate by one-way communication or two-way communication, employing any one of a space division multiplex method, a polarization division multiplex method, a frequency division multiplex method, a time division multiplex method, a code division multiplex method, or an orthogonal frequency division multiplex method.

For a frequency of a carrier wave of the semiconductor device and the communication device, any of the following may be employed: higher than or equal to 300 GHz and lower than 3 THz, which is the frequency of a submillimeter wave; higher than or equal to 30 GHz and lower than 300 GHz, which is the frequency of a millimeter wave; higher than or equal to 3 GHz and lower than 30 GHz, which is the frequency of a microwave; higher than or equal to 300 MHz and lower than 3 GHz, which is the frequency of an ultrahigh frequency wave; higher than or equal to 30 MHz and lower than 300 MHz, which is the frequency of a very high frequency wave; higher than or equal to 3 MHz and lower than 30 MHz, which is the frequency of a short wave; higher than or equal to 300 kHz and lower than 3 MHz, which is the frequency of a medium wave; higher than or equal to 30 kHz and lower than 300 kHz, which is the frequency of a long wave; and higher than or equal to 3 kHz and lower than 30 kHz, which is the frequency of a very low frequency wave. A carrier wave of the semiconductor device and the communication device may be modulated by either analog modulation or digital modulation, and any one of amplitude modulation, phase modulation, frequency modulation, or spread spectrum modulation may be employed. It is preferable that the amplitude modulation or the frequency modulation be used.

Figure 2:
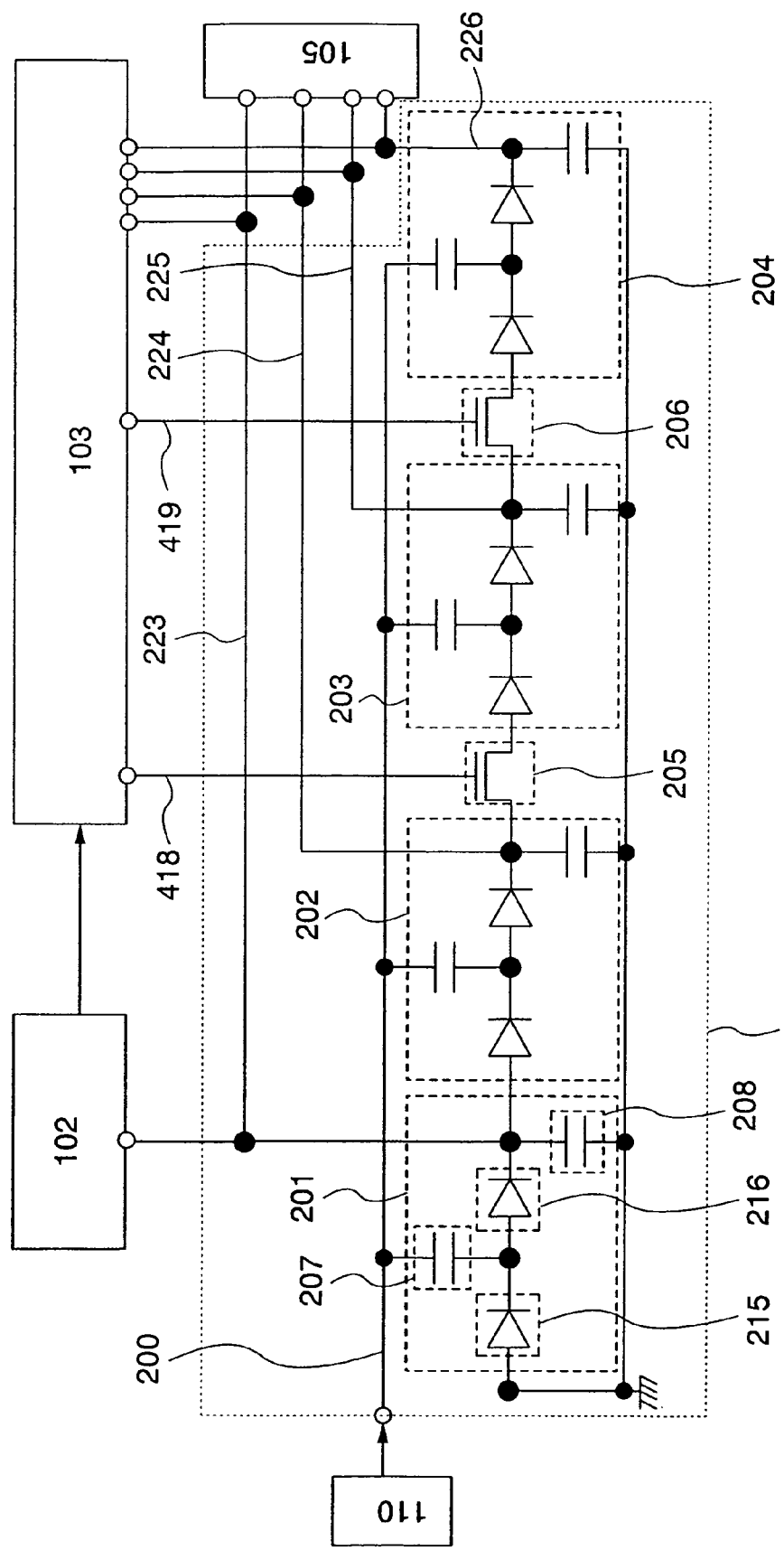
FIG. 2 is a diagram for describing Embodiment Mode 1.

Next, a structural example of the boosting circuit 101 shown in FIG. 1 is shown in FIG. 2. Note that FIG. 2 shows a structure of a boosting circuit with four stages provided with four charge pumps as an example. This invention is not limited to the boosting circuit with four stages provided with four charge pumps and may be a boosting circuit with n stages (n is a natural number of 2 or more) provided with n charge pumps.

The boosting circuit 101 shown in FIG. 2 includes an input wiring 200, a first charge pump 201, a second charge pump 202, a third charge pump 203, a fourth charge pump 204, a first n-channel transistor 205, and a second n-channel transistor 206. The input wiring 200 to which output from the antenna 110 is input is electrically connected to input terminals of the first to fourth charge pumps 201 to 204. An output terminal of the first charge pump 201 is electrically connected to the input terminal of the second charge pump 202. An output terminal of the second charge pump 202 is electrically connected to a first terminal of the first n-channel transistor 205. A second terminal of the first n-channel transistor 205 is electrically connected to the input terminal of the third charge pump 203. An output terminal of the third charge pump 203 is electrically connected to a first terminal of the second n-channel transistor 206. A second terminal of the second n-channel transistor 206 is electrically connected to the input terminal of the fourth charge pump 204. An output terminal of the fourth charge pump 204 is electrically connected to the output changeover switch 105. A first output wiring 223, a second output wiring 224, a third output wiring 225, and a fourth output wiring 226 that output voltages from the first to fourth charge pumps 201 to 204 are electrically connected to the output changeover switch 105. Gates of the first n-channel transistor 205 and the second n-channel transistor 206 are electrically connected to an output wiring 418 and an output wiring 419, respectively, of the voltage comparison circuit 103 in order to control on/off of the transistors.

The first n-channel transistor 205 and the second n-channel transistor 206 function as switches that change the number of stages of the charge pumps in the boosting circuit 101. In other words, the first n-channel transistor 205 and the second n-channel transistor 206 are the switches that change the number of charge pumps actually used for boosting voltage in the plurality of charge pumps in the boosting circuit 101. The first n-channel transistor 205 and the second n-channel transistor 206 also function as switches that change the number of output stages in the boosting circuit 101. Gates of the first n-channel transistor 205 and the second n-channel transistor 206 are electrically connected to the output wiring 418 and the output wiring 419, respectively, of the voltage comparison circuit 103. The gate of the first n-channel transistor 205 opens or closes a channel between the first terminal and the second terminal of the first n-channel transistor 205 in response to a signal from the output wiring 418 in the voltage comparison circuit 103, and the gate of the second n-channel transistor 206 opens or closes a channel between the first terminal and the second terminal of the second n-channel transistor 206 in response to a signal from the output wiring 419 in the voltage comparison circuit 103. In addition, a switch provided between each of the plurality of charge pumps may be provided for every plurality of charge pumps or every single charge pump. When one switch is provided for the plurality of charge pumps, the number of switches can be reduced and the semiconductor device can be downsized. Alternatively, when the switch is provided for every charge pump, a predetermined output voltage can be easily obtained.

Note that a transistor is an element having at least three terminals of a gate, a drain, and a source. The transistor has a channel between the drain and the source, and current can flow through the drain, the channel, and the source. Here, it is difficult to determine which is the source or the drain since they switch to each other depending on the structure, operating condition, and the like of the transistor. Therefore, in this specification, a region functioning as a source and a drain may not be called the source or the drain in some cases. In that case, they are referred to as a first terminal or a second terminal, for example.

The first to fourth charge pumps 201 to 204 included in the boosting circuit 101 shown in FIG. 2 each include a first capacitor element 207, a second capacitor element 208, a first diode 215, and a second diode 216 by way of example. In the first charge pump 201, a first electrode of the first capacitor element 207 is electrically connected to the input wiring 200. A second electrode of the first capacitor element 207 is electrically connected to a second electrode of the first diode 215 and a first electrode of the second diode 216. A first electrode of the first diode 215 is electrically connected to ground potential. The second diode 216 is electrically connected to the first electrode of the first diode 215 in the second charge pump. In the second charge pump 202, a second electrode of the second diode 216 is electrically connected to the first electrode of the first diode 215 in the third charge pump through the first n-channel transistor 205. In the third charge pump 203, a second electrode of the second diode 216 is electrically connected to the first electrode of the first diode 215 in the fourth charge pump through the second n-channel transistor 206. A first electrode of the second capacitor element 208 is electrically connected to the second electrode of the second diode 216 which is an output of the first charge pump, and a second electrode of the second capacitor element 208 is electrically connected to the ground potential.

Note that the capacitor elements shown in FIG. 2 each have an electrical connection using two terminals. In that case, one electrode of each of the capacitor elements is called a first electrode and the other electrode is called a second electrode. Further, the diodes shown in FIG. 2 each have an electrical connection using two terminals. In that case, an anode of each of the diodes is called a first electrode and a cathode of each of the diodes is called a second electrode.

The charge pump is a circuit having a function of outputting a higher voltage than a voltage to be input. In addition, the larger the number of charge pumps included in the boosting circuit becomes, the higher the voltage can be boosted.

Figure 3:
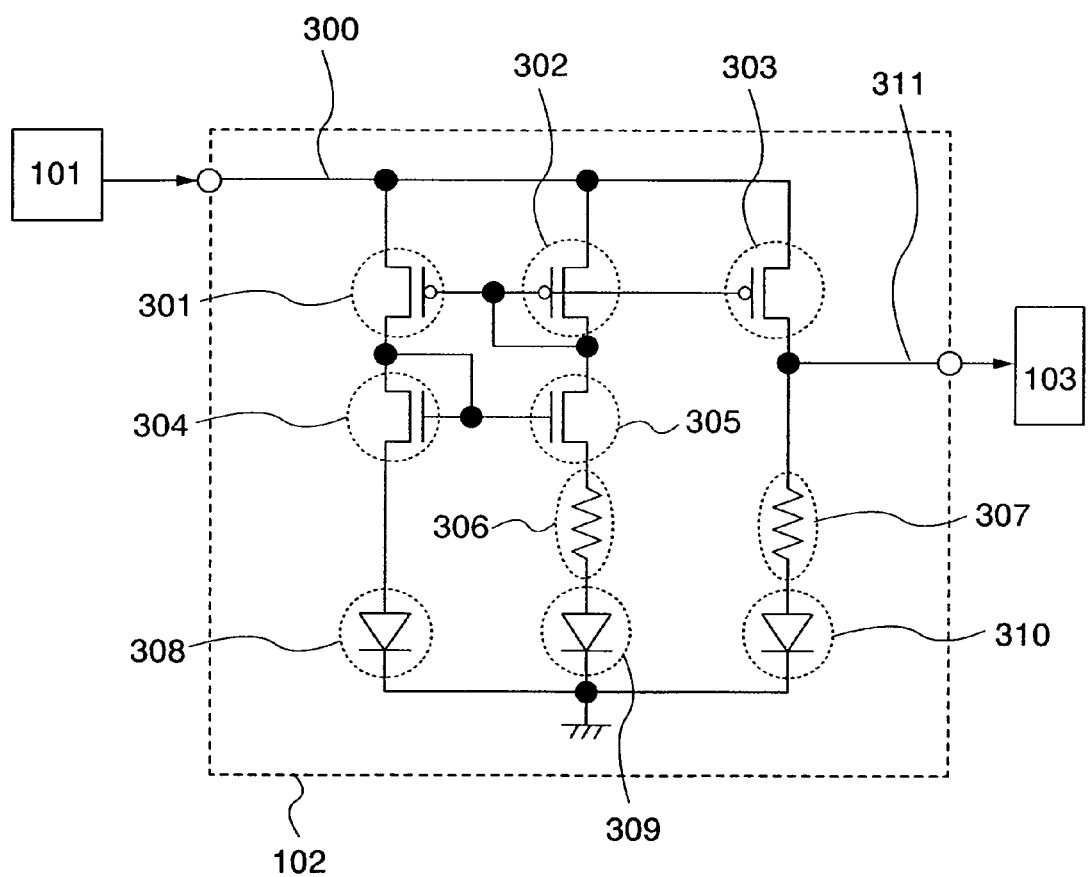
FIG. 3 is a diagram for describing Embodiment Mode 1.

Next, FIG. 3 shows a structural example of the reference voltage supply circuit 102 shown in FIG. 1.

In the case where only the first charge pump 201 is used, the charge pump operates as a rectifier circuit. Since the semiconductor device is supplied with electric power through an electromagnetic wave with high frequency from the communication device, electromotive force obtained in the antenna 110 is AC voltage. Output of the first charge pump 201 is input to the reference voltage supply circuit 102 as source of voltage supply because a rectified DC voltage is necessary for the reference voltage supply circuit 102.

As shown in FIG. 3, the reference voltage supply circuit 102 includes an input wiring 300, a first p-channel transistor 301, a second p-channel transistor 302, a third p-channel transistor 303, a first n-channel transistor 304, a second n-channel transistor 305, a first resistor element 306, a second resistor element 307, a first diode 308, a second diode 309, and a third diode 310. The input wiring 300 to which an output voltage is input from the boosting circuit 101 is electrically connected to the output wiring 223 of the first charge pump. The input wiring 300 is electrically connected to a first terminal of each of the first to third p-channel transistors 301 to 303. In addition, a gate electrode of each of the first p-channel transistor 301 and the second p-channel transistor 302 is electrically connected to a second terminal of the second p-channel transistor 302. A second terminal of the first p-channel transistor 301 is electrically connected to a first terminal and a gate electrode of the first n-channel transistor 304 and a gate electrode of the second n-channel transistor 305. A first terminal of the second n-channel transistor 305 is electrically connected to a second terminal of the second p-channel transistor 302, and a second terminal of the second n-channel transistor 305 is electrically connected to ground potential through the first resistor element 306 and the second diode 309. A second terminal of the first n-channel transistor 304 is electrically connected to the ground potential through the first diode 308. A second terminal of the third p-channel transistor 303 is electrically connected to the output wiring 311, and the ground potential through the second resistor element 307 and the third diode 310. In addition, a second electrode of each of the first to third diodes 308 to 310 is electrically connected to the ground potential. By employing a circuit configuration having connection shown in FIG. 3, the reference voltage supply circuit 102 can step-down the input voltage from the boosting circuit 101 and generate a reference voltage to be supplied to the voltage comparison circuit 103.

Figure 4:
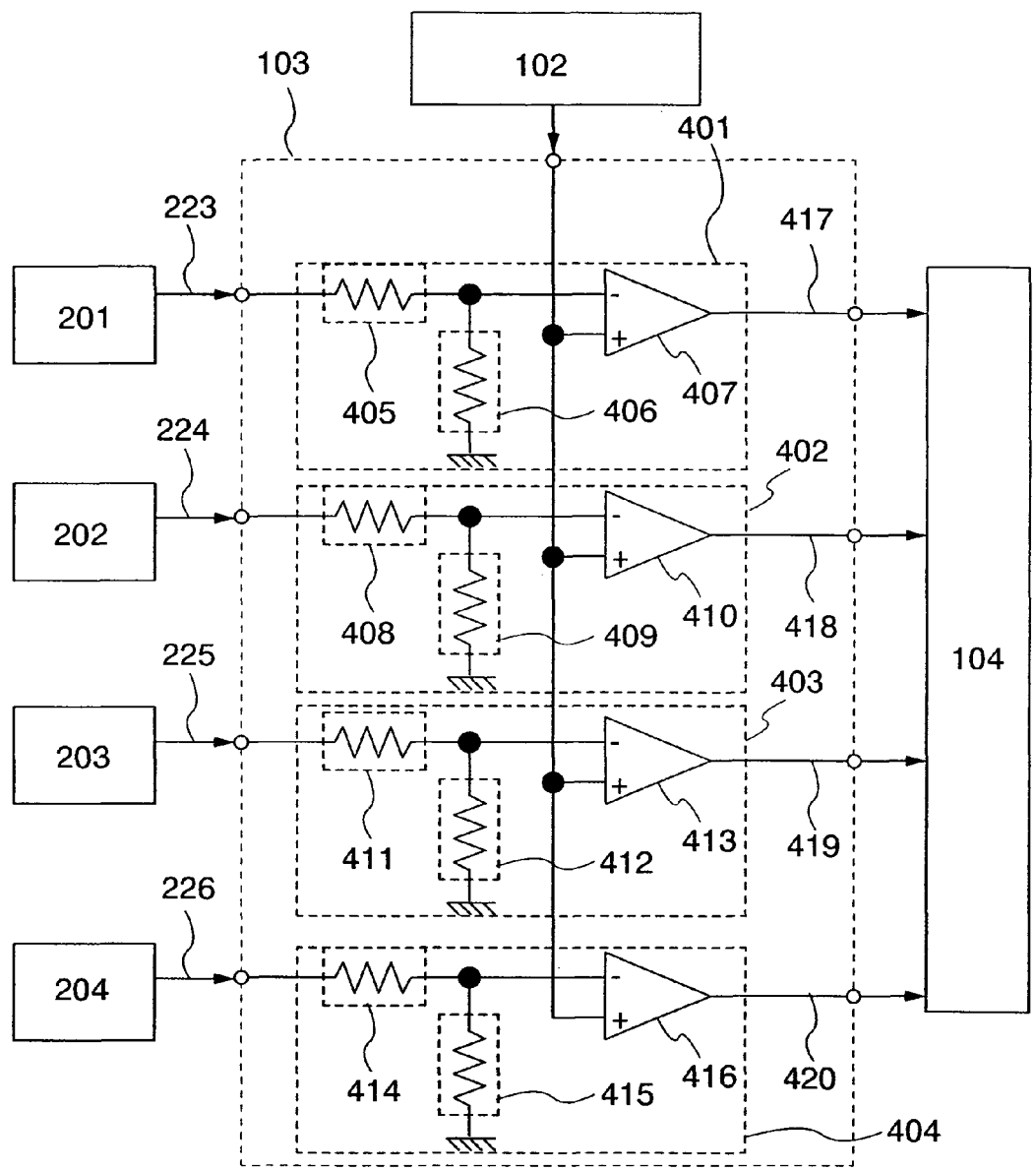
FIG. 4 is a diagram for describing Embodiment Mode 1.

Next, FIG. 4 shows a structural example of the voltage comparison circuit 103 shown in FIG. 1.

The voltage comparison circuit 103 shown in FIG. 4 includes a first voltage comparison circuit 401, a second voltage comparison circuit 402, a third voltage comparison circuit 403, and a fourth voltage comparison circuit 404 which correspond to the number of the plurality of charge pumps included in the boosting circuit 101. Then, input terminals of the first to fourth voltage comparison circuit 401 to 404 are electrically connected to the output wiring 223 of the first charge pump 201, the output wiring 224 of the second charge pump 202, the output wiring 225 of the third charge pump 203, and the output wiring 226 of the fourth charge pump 204, respectively. In addition, an output wiring 417 of the first voltage comparison circuit 401, an output wiring 418 of the second voltage comparison circuit 402, an output wiring 419 of the third voltage comparison circuit 403, and an output wiring 420 of the fourth voltage comparison circuit 404 are electrically connected to the switch controller 104.

The first voltage comparison circuit 401 includes a first resistor element 405, a second resistor element 406, and a first comparator 407. The first resistor element 405 is electrically connected to the output wiring 223 of the first charge pump 201, the second resistor element 406, and an inverting input terminal of the first comparator 407. The second resistor element 406 is grounded. A non-inverting input terminal of the first comparator 407 is electrically connected to an output of the reference voltage supply circuit 102. Note that a voltage obtained by dividing an output voltage from the first charge pump 201 by the first resistor element 405 and the second resistor element 406 is denoted as a voltage V_1 which is based on the output voltage from the first charge pump 201.

Similarly, the second voltage comparison circuit 402 includes a third resistor element 408, a fourth resistor element 409, and a second comparator 410. The third resistor element 408 is electrically connected to the output wiring 224 of the second charge pump 202, the fourth resistor element 409, and an inverting input terminal of the second comparator 410. A non-inverting input terminal of the second comparator 410 is electrically connected to an output of the reference voltage supply circuit 102. The third voltage comparison circuit 403 includes a fifth resistor element 411, a sixth resistor element 412, and a third comparator 413. The fifth resistor element 411 is electrically connected to the output wiring 225 of the third charge pump 203, the sixth resistor element 412, and an inverting input terminal of the third comparator 413. A non-inverting input terminal of the third comparator 413 is electrically connected to the output of the reference voltage supply circuit 102. The fourth voltage comparison circuit 404 includes a seventh resistor element 414, an eighth resistor element 415, and a fourth comparator 416. The seventh resistor element 414 is electrically connected to the output wiring 226 of the fourth charge pump 204, the eighth resistor element 415, and an inverting input terminal of the fourth comparator 416. A non-inverting input terminal of the fourth comparator 416 is electrically connected to the output of the reference voltage supply circuit 102. Note that a voltage obtained by dividing an output voltage from the second charge pump 202 by the third resistor element 408 and the fourth resistor element 409 is denoted as a voltage V_2 which is based on the output voltage from the second charge pump 202. A voltage obtained by dividing an output voltage from the third charge pump 203 by the fifth resistor element 411 and the sixth resistor element 412 is denoted as a voltage V_3 which is based on the output voltage from the third charge pump 203. A voltage obtained by dividing an output voltage from the fourth charge pump 204 by the seventh resistor element 414 and the eighth resistor element 415 is denoted as a voltage V_4 which is based on the output voltage from the fourth charge pump 204.

Note that gate electrodes of the first n-channel transistor 205 and the second n-channel transistor 206 for switching an output stage of the boosting circuit 101 are connected to the output wiring 418 of the second voltage comparison circuit 402 and the output wiring 419 of the third voltage comparison circuit 403, respectively, as described above. An n-channel transistor is not provided between the first charge pump 201 and the second charge pump 202 in the boosting circuit 101 shown in FIG. 2 in order to secure the output voltage of the boosting circuit 101.

In specific, for example, a case where an output from the second charge pump 202 is an output voltage from the boosting circuit 101 will be described. At that time, a relation between the voltages based on output voltages of respective charge pumps and the reference voltage which is denoted as Vref is V_1<V_2<Vref<V_3<V_4. As long as the relation is maintained, an output stage of the boosting circuit is not switched. On the other hand, when the voltage V_3 based on the output voltage from the third charge pump 203 is lower than the reference voltage Vref and the voltage V_4 based on the output voltage from the fourth charge pump 204 is higher than the reference voltage Vref, that is, V_1<V_2<V_3<Vref<V_4, the output from the second charge pump 202 is switched to output from the third charge pump 203. Alternatively, when the voltage V_2 based on the output voltage from the second charge pump 202 is higher than the reference voltage Vref, that is, V_1<Vref<V_2<V_3<V_4, the output stage of the boosting circuit 101 is switched from the output from the second charge pump 202 to output from the first charge pump 201. In this embodiment mode, the switch controller 104 that changes the output stage of the boosting circuit 101 uses a voltage based on an output voltage of a stage which is a next stage of the output stage, as a control signal for selecting the output stage of the charge pump. When the first charge pump 201 is selected as the output stage of the boosting circuit 101, the output voltage of the second charge pump 202 is always necessary to be monitored by the voltage comparison circuit 103. Therefore, a switch using a transistor or the like does not need to be provided between the first charge pump 201 and the second charge pump 202 for electrical isolation. Thus, operation is possible without providing an n-channel transistor between the first charge pump 201 and the second charge pump 202, whereby an effect such as reduction in the number of transistors can be achieved in this embodiment mode.

Note that terms such as first, second, third to Nth (N is a natural number) seen in this specification are used in order to avoid confusion between components and do not set a limitation on number.

A voltage output from the output wiring 223 of the first charge pump 201 is input to the first voltage comparison circuit 401, the first comparator 407 compares an intermediate voltage (V_1), which is divided by the first resistor element 405 and the second resistor element 406, of a node between them, with a voltage (Vref) supplied from the reference voltage supply circuit 102, and an output signal of the first comparator 407 is determined in accordance with a magnitude relation of these voltages. Similarly, output signals from the second comparator 410, the third comparator 413, and the fourth comparator 416 are determined in accordance with V_2 to V_4 and Vref. Output from the first to fourth comparators are digital signals of "high" (also referred to as a high potential signal or simply, an H signal) or "low" (also referred to as a low potential signal or simply, an L signal).

Figure 5:
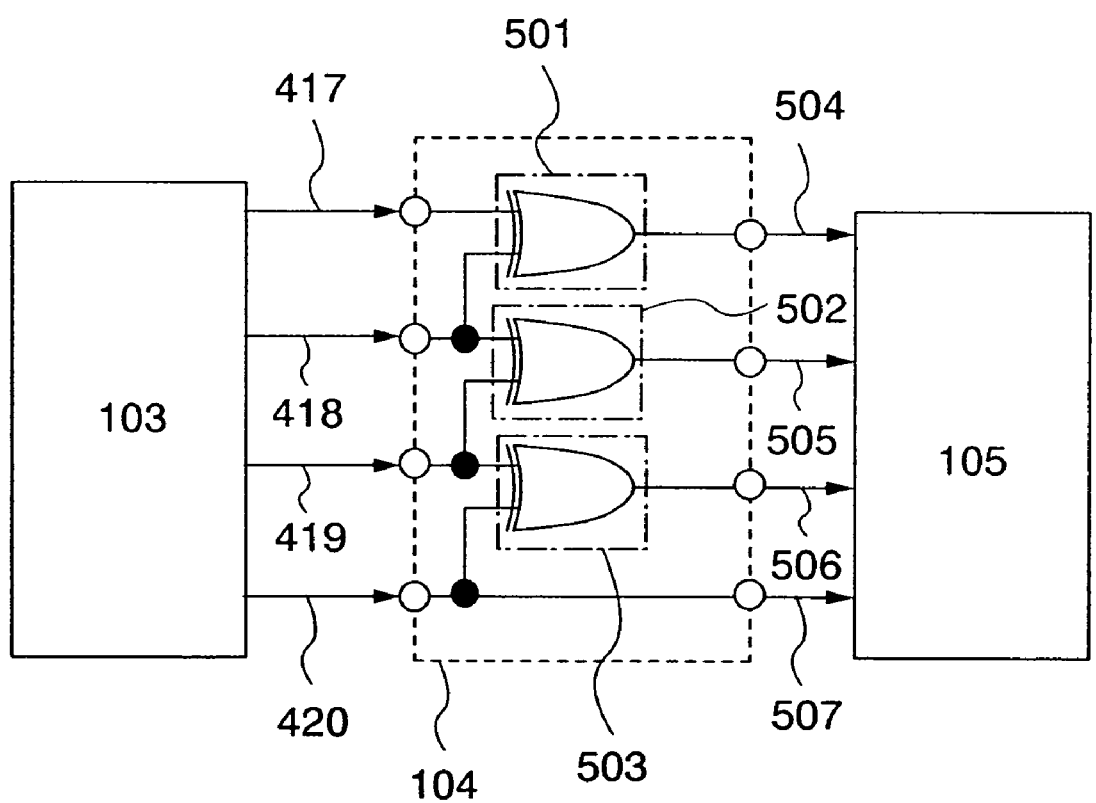
FIG. 5 is a diagram for describing Embodiment Mode 1.

FIG. 5 shows a structural example of the switch controller 104 shown in FIG. 1.

The switch controller 104 shown in FIG. 5 includes a first Exclusive-OR (Ex-OR) circuit 501, a second Ex-OR circuit 502, and a third Ex-OR circuit 503. The Ex-OR circuits output an L signal when two input signals are the same and output an H signal when two input signals are different.

The output wiring 417 of the first voltage comparison circuit 401 and the output wiring 418 of the second voltage comparison circuit 402 are electrically connected to terminals on an input side of the first Ex-OR circuit 501. The output wiring 418 of the second voltage comparison circuit 402 and the output wiring 419 of the third voltage comparison circuit 403 are electrically connected to terminals on an input side of the second Ex-OR circuit 502. The output wiring 419 of the third voltage comparison circuit 403 and the output wiring 420 of the fourth voltage comparison circuit 404 are electrically connected to terminals on an input side of the third Ex-OR circuit 503. In addition, first to fourth controller output wirings 504 to 507, to which a signal of the output wiring 420 of the fourth voltage comparison circuit 404 and output signals of the first to third Ex-OR circuits 501 to 503 are output from the switch controller 104, are electrically connected to the output changeover switch 105.

Figure 6:
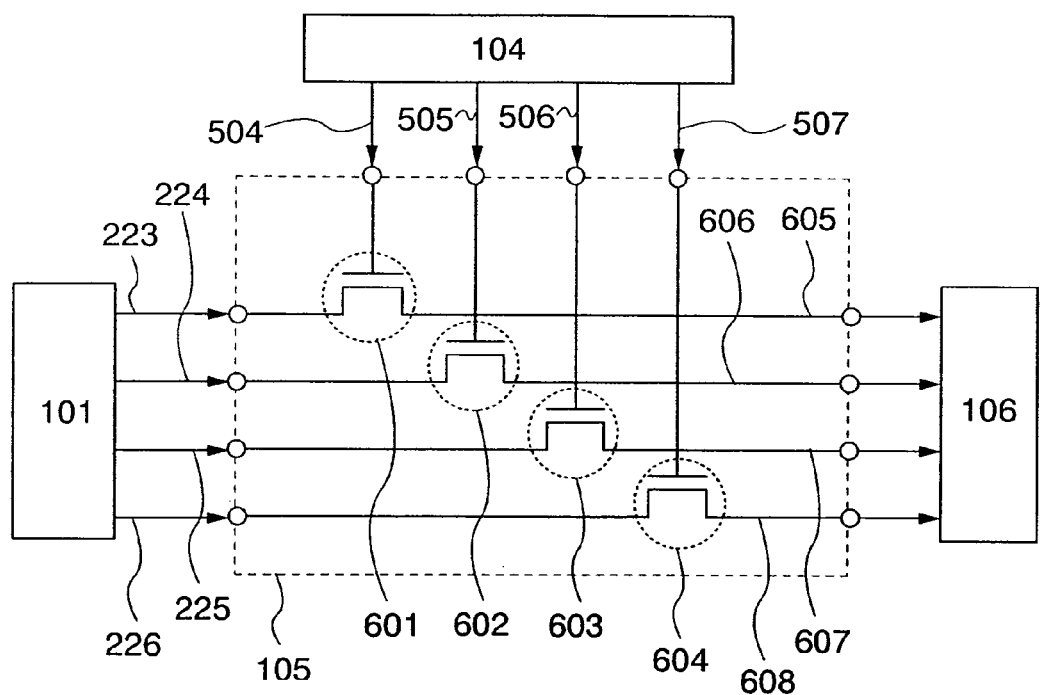
FIG. 6 is a diagram for describing Embodiment Mode 1.

FIG. 6 shows a structural example of the output changeover switch 105 shown in FIG. 1. The output changeover switch 105 includes a third n-channel transistor 601, a fourth n-channel transistor 602, a fifth n-channel transistor 603, and a sixth n-channel transistor 604. A first terminal of the third n-channel transistor 601 is electrically connected to the output wiring 223 of the first charge pump 201, a second terminal of the third n-channel transistor 601 is electrically connected to the first output wiring 605, and a gate of the third n-channel transistor 601 is electrically connected to the first controller output wiring 504. A first terminal of the fourth n-channel transistor 602 is electrically connected to the output wiring 224 of the second charge pump 202, a second terminal of the fourth n-channel transistor 602 is electrically connected to the second output wiring 606, and a gate of the fourth n-channel transistor 602 is electrically connected to the second controller output wiring 505. A first terminal of the fifth n-channel transistor 603 is electrically connected to the output wiring 225 of the third charge pump 203, a second terminal of the fifth n-channel transistor 603 is electrically connected to the third output wiring 607, and a gate of the fifth n-channel transistor 603 is electrically connected to the third controller output wiring 506. A first terminal of the sixth n-channel transistor 604 is electrically connected to the output wiring 226 of the fourth charge pump 204, a second terminal of the sixth n-channel transistor 604 is electrically connected to the fourth output wiring 608, and a gate of the sixth n-channel transistor 604 is electrically connected to the fourth controller output wiring 507.

The third to sixth n-channel transistors 601 to 604 function as opening or closing switches that determine whether output voltages from the first to fourth charge pumps 201 to 204 are input to the logic circuit 106 or not. Among the plurality of charge pumps in the boosting circuit 101, the output stage is always only one selected stage.

Next, operation of changing the number of stages of the charge pump included in the boosting circuit 101 (changing an output stage) will be described.

The semiconductor device receives a receive signal transmitted from the communication device by the antenna. When electric power output from the communication device is constant, electric power obtained through the receive signal depends on a distance between the communication device and the semiconductor device. Thus, the shorter the distance becomes, the larger the amount of the electric power to be supplied to the semiconductor device becomes.

When the distance between the communication device and the semiconductor device is short, the amount of the electric power the semiconductor device receives is extremely large. At that time, a voltage Vin generated by using one charge pump which is included in the boosting circuit is high and a voltage required for operating circuits in the semiconductor device can be obtained even if the number of the charge pumps in the dc-dc circuit is small.

On the other hand, when the distance between the communication device and the semiconductor device is long, the amount of the electric power the semiconductor device receives is extremely small. At that time, the voltage Vin generated by using one charge pump which is included in the boosting circuit is low and the voltage required for operating the circuits in the semiconductor device cannot be obtained as long as the number of the charge pumps in the dc-dc circuit is small.

The number of stages of the charge pumps in the boosting circuit (the number of charge pumps actually used for boosting voltage among the plurality of charge pumps in the boosting circuit 101) is changed when the switch controller 104 selects an appropriate output stage in accordance with a result from comparison of the reference voltage Vref with each output from the first to fourth charge pumps 201 to 204 in the voltage comparison circuit.

By employing the above-described structure, even when the distance between the semiconductor device of this invention and the communication device is changed and the amount of electric power supply is changed, the output stage of the boosting circuit is selected in accordance with a communication distance at that time and an appropriate output voltage can be obtained.

Next, specific operation of selecting the output stage of the boosting circuit in accordance with the state of the output voltage from the charge pump will be described.

Operation of output changeover in the boosting circuit will be described in specific with reference to FIGS. 7A and 7B, FIGS. 8A and 8B, and FIG. 9. FIGS. 7A and 7B, FIGS. 8A and 8B, and FIG. 9 show the first charge pump 201, the second charge pump 202, the third charge pump 203, the fourth charge pump 204, a first switch 701, a second switch 702, a third switch 703, a fourth switch 704, a fifth switch 705, a sixth switch 706, the output wiring 223 of the first charge pump, the output wiring 224 of the second charge pump, the output wiring 225 of the third charge pump, and the output wiring 226 of the fourth charge pump. Since FIGS. 7A and 7B, FIGS. 8A and 8B, and FIG. 9 are diagrams for describing on/off operation of each switch, circuits and the like about the boosting circuit are not shown in detail. Moreover, in FIGS. 7A and 7B, FIGS. 8A and 8B, and FIG. 9, in order to express electrical connection of n-channel transistors, the n-channel transistors are denoted as switches and the electrical connection is described by on/off of the switches.

Figure 7A:
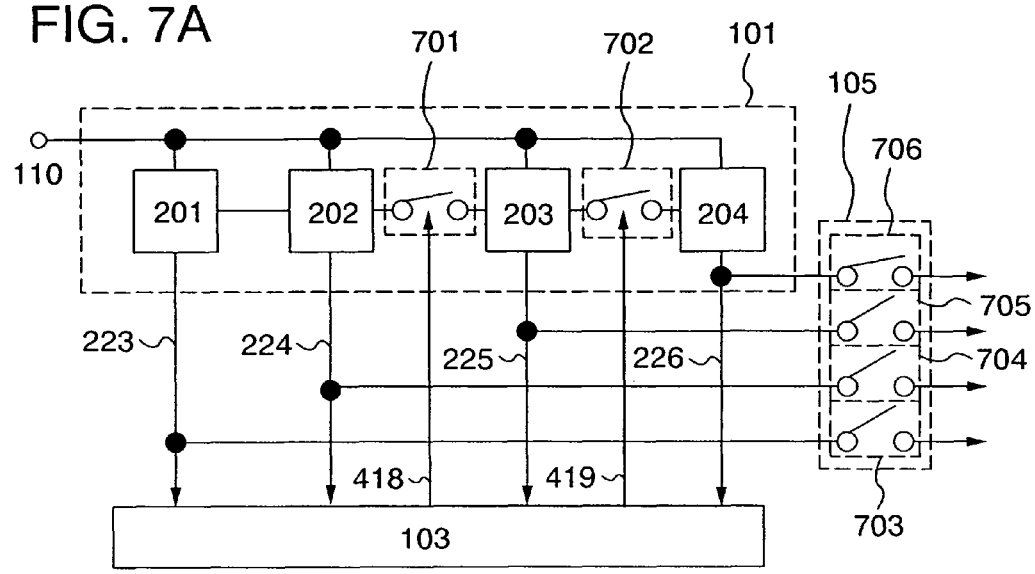
FIGS. 7A and 7B are diagrams for describing Embodiment Mode 1.

Connection between blocks shown in FIGS. 7A and 7B, FIGS. 8A and 8B, and FIG. 9 will be briefly described. As shown in FIG. 7A, the first to fourth charge pumps 201 to 204 are electrically connected to the antenna 110. The first charge pump 201 is electrically connected to the second charge pump 202. The second charge pump 202 is electrically connected to the third charge pump 203 through the first switch 701. The third charge pump 203 is electrically connected to the fourth charge pump 204 through the second switch 702. The output wirings 223 to 226 of the first to fourth charge pumps 201 to 204 are electrically connected to the third to sixth switches 703 to 706, respectively.

In the description with reference to FIGS. 7A and 7B, FIGS. 8A and 8B, and FIG. 9, an output voltage of a charge pump in an n-th stage is denoted as Vn and the output voltage of the reference voltage supply circuit is denoted as Vref. For example, when the first charge pump 201 is the first stage, the output voltage is V1 and when the fourth charge pump 204 is the fourth stage, the output voltage is V4. Moreover, in the voltage comparison circuit 103, a voltage on the basis of an output voltage from the first charge pump 201 is denoted as V_1, and a voltage on the basis of the output voltage from the fourth charge pump 204 is denoted as V_4.

Figure 7B:
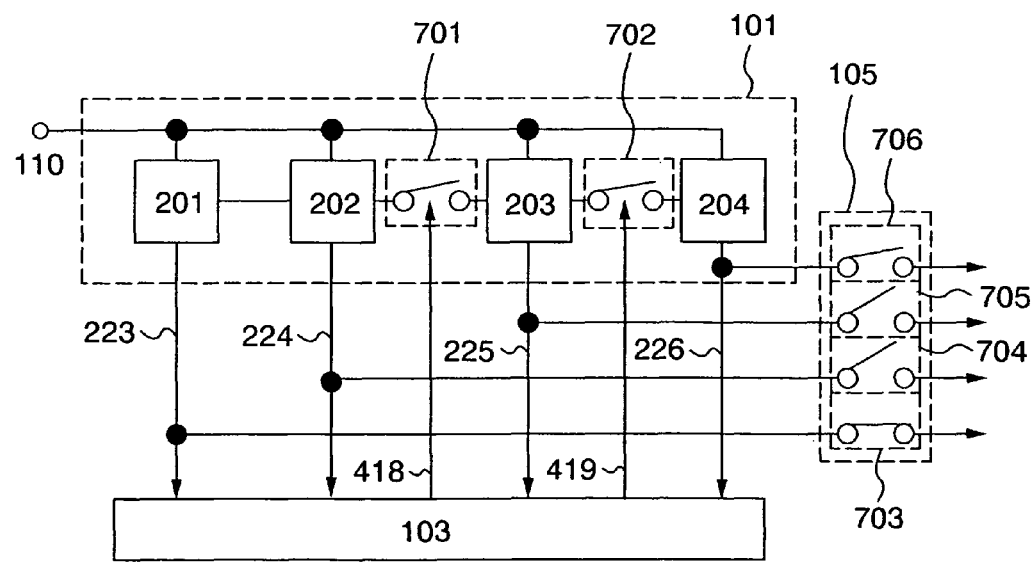

In the case of V_1<Vref<V_2<V_3<V_4, on/off of each switch in FIG. 7A is as shown in FIG. 7B. In the voltage comparison circuit 103, the output wiring 417 of the first comparator 407 outputs an H signal and the output wiring 418 of the second comparator 410, the output wiring 419 of the third comparator 413, and the output wiring 420 of the fourth comparator 416 output L signals. Since a signal for controlling on/off of the first switch 701 is the same as the signal from the output wiring 418 of the second comparator 410, and a signal for controlling on/off of the second switch 702 is the same as the signal from the output wiring 419 of the third comparator 413, the first switch 701 and the second switch 702 to which the L signals are input are turned off. Therefore, the third charge pump 203 and the fourth charge pump 204 are not electrically connected to the first charge pump 201 and the second charge pump 202 and not supplied with electric power, whereby the output voltages from the third charge pump 203 and the fourth charge pump 204 cannot be obtained. Moreover, in the switch controller 104 described in FIG. 5, the first controller output wiring 504 outputs an H signal and the second to fourth controller output wirings 505 to 507 output L signals. Thus, the third switch 703 is turned on and the fourth to sixth switches 704 to 706 are turned off. Therefore, only the output voltage V1 from the first charge pump 201 can be obtained.

Figure 8A:
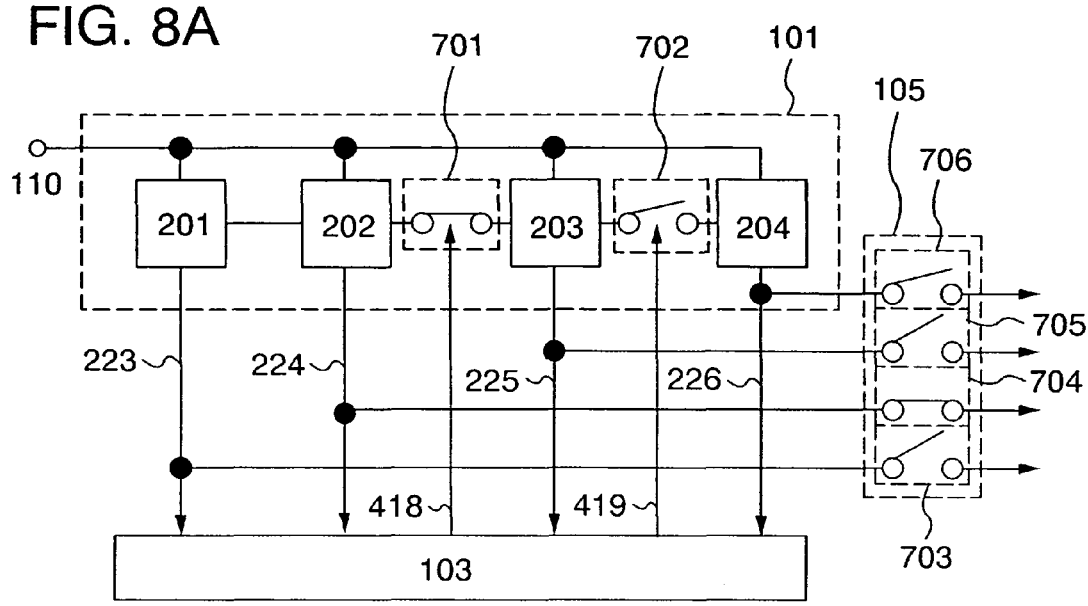
FIGS. 8A and 8B are diagrams for describing Embodiment Mode 1.

In the case of V_1<V_2<Vref<V_3<V_4, on/off of each switch is as shown in FIG. 8A. The output wiring 417 of the first comparator 407 and the output wiring 418 of the second comparator 410 output H signals and the output wiring 419 of the third comparator 413 and the output wiring 420 of the fourth comparator 416 output L signals. Since the signal for controlling on/off of the first switch 701 is the same as the signal from the output wiring 418 of the second comparator 410, and the signal for controlling on/off of the second switch 702 is the same as the signal from the output wiring 419 of the third comparator 413, the first switch 701 to which the H signal is input is turned on and the second switch 702 to which the L signal is input is turned off. Therefore, the third charge pump 203 is electrically connected to the first charge pump 201 and the second charge pump 202 so that the output voltage can be obtained. That is, the output voltage from the third charge pump 203 is obtained by switching the output stage of the boosting circuit when the distance between the semiconductor device and the communication device is changed and the electric power supply is increased or decreased. On the other hand, the fourth charge pump 204 is not electrically connected to the first to third charge pumps 201 to 203 and not supplied with electric power, whereby the output voltage from the fourth charge pump 204 cannot be obtained. Moreover, in the switch controller 104 described in FIG. 5, the second controller output wiring 505 outputs an H signal and the first controller output wiring 504, the third controller output wiring 506, and the fourth controller output wiring 507 output L signals. Thus, the fourth switch 704 is turned on and the third switch 703, the fifth switch 705, and the sixth switch 706 are turned off. Therefore, only an output voltage V2 from the second charge pump 202 can be obtained.

Figure 8B:
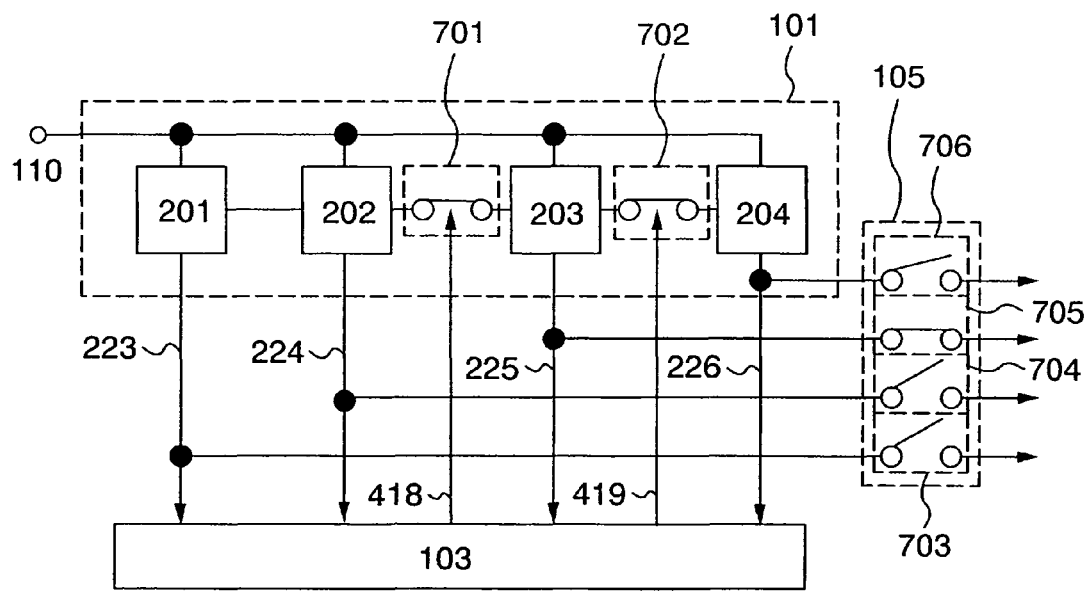

In the case of V_1<V_2<V_3<Vref<V_4, on/off of each switch is as shown in FIG. 8B. The output wiring 417 of the first comparator 407, the output wiring 418 of the second comparator 410, and the output wiring 419 of the third comparator 413 output H signals and the output wiring 420 of the fourth comparator 416 outputs an L signal. Since the signal for controlling on/off of the first switch 701 is the same as the signal from the output wiring 418 of the second comparator 410, and the signal for controlling on/off of the second switch 702 is the same as the signal from the output wiring 419 of the third comparator 413, the first switch 701 and the second switch 702 to which the H signals are input are turned on. Therefore, the third charge pump 203 and the fourth charge pump 204 are electrically connected to the first charge pump 201 and the second charge pump 202 so that the output voltages can be obtained. That is, the output voltage from the fourth charge pump 204 is obtained by switching the output stage of the boosting circuit when the distance between the semiconductor device and the communication device is changed and the electric power supply is increased or decreased. Moreover, in the switch controller 104 described in FIG. 5, the third controller output wiring 506 outputs an H signal and the first controller output wiring 504, the second controller output wiring 505, and the fourth controller output wiring 507 output L signals. Thus, the fifth switch 705 is turned on and the third switch 703, the fourth switch 704 and the sixth switch 706 are turned off. Therefore, only the output voltage V3 from the third charge pump 203 can be obtained.

Figure 9:
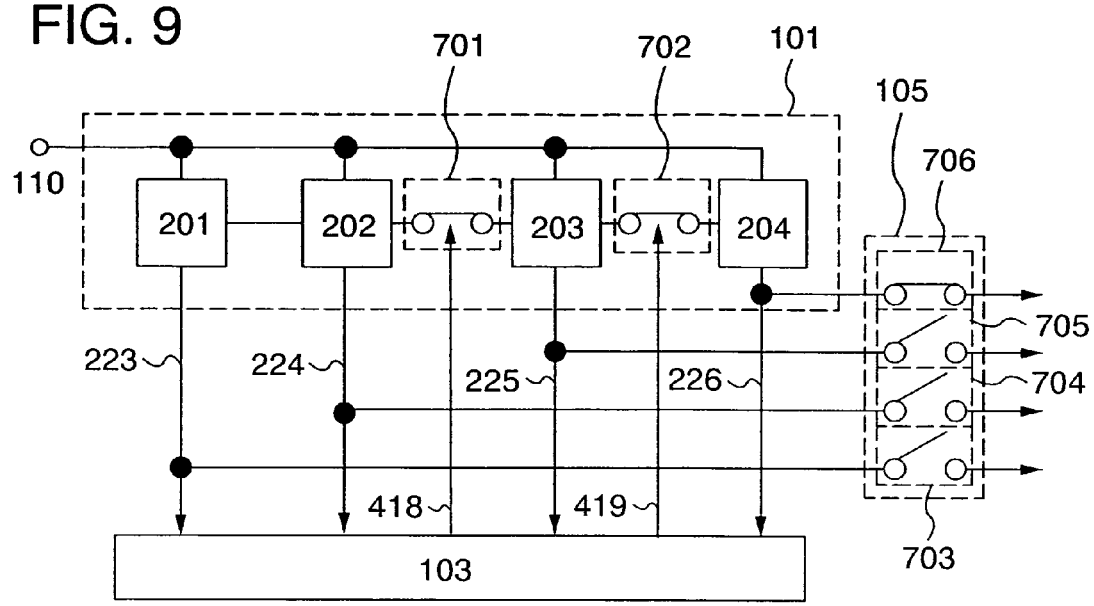
FIG. 9 is a diagram for describing Embodiment Mode 1.

In the case of V_1<V_2<V_3<V_4<Vref, on/off of each switch is as shown in FIG. 9. The output wiring 417 of the first comparator 407, the output wiring 418 of the second comparator 410, the output wiring 419 of the third comparator 413, and the output wiring 420 of the fourth comparator 416 output H signals. Since the signal for controlling on/off of the first switch 701 is the same as the signal from the output wiring 418 of the second comparator 410, and the signal for controlling on/off of the second switch 702 is the same as the signal from the output wiring 419 of the third comparator 413, the first switch 701 and the second switch 702 to which the H signals are input are turned on. Therefore, the third charge pump 203 and the fourth charge pump 204 are electrically connected to the first charge pump 201 and the second charge pump 202 so that the output voltages can be obtained. That is, the output voltage from the fourth charge pump 204 is obtained by switching the output stage of the boosting circuit when the distance between the semiconductor device and the communication device is changed and the electric power supply is increased or decreased. Moreover, in the switch controller 104 described in FIG. 5, the fourth controller output wiring 507 outputs an H signal and the first to third controller output wirings 504 to 506 output L signals. Thus, the sixth switch 706 is turned on and the third switch 703, the fourth switch 704, and the fifth switch 705 are turned off. Therefore, only the output voltage V4 from the fourth charge pump 204 can be obtained.

When one of the third to sixth switches 703 to 706 is turned on, output from the boosting circuit 101 to the logic circuit 106 can be obtained. With the switch controller 104 and the output changeover switch 105 having structures shown in FIGS. 5 and 6, two or more of the third to sixth switches 703 to 706 are not turned on at the same time so that output from the plurality of charge pumps can be prevented.

In the case of Vref<V_1<V_2<V_3<V_4, on/off of each switch is as shown in FIG. 7A. The output wiring 417 of the first comparator 407, the output wiring 418 of the second comparator 410, the output wiring 419 of the third comparator 413, and the output wiring 420 of the fourth comparator 416 output L signals. At that time, the L signals are input to the third to sixth switches 703 to 706 and the third to sixth switches 703 to 706 are turned off; thus, the first to fourth charge pumps 201 to 204 in the boosting circuit 101 do not output voltages to the logic circuit 106.

However, the number of outputs can be increased or decreased by changing the structure of the logic circuit in the switch controller 104. In addition, when the resistance ratio of two resistor elements in the voltage comparison circuit is changed, voltage for comparison in the charge pump varies; therefore, in order to adjust the voltage for comparison, the resistance value may be changed. Note that "the output stage of the boosting circuit" corresponds to the charge pump that is at the last stage of the plurality of charge pumps actually used for boosting voltage. For example, each of the first charge pump 201 in FIG. 7B, the second charge pump 202 in FIG. 8A, the third charge pump 203 in FIG. 8B, and the fourth charge pump 204 in FIG. 9 corresponds to the output stage in the boosting circuit 101.

By employing the above-described structure, a voltage value which depends on the distance between the semiconductor device and the communication device can be controlled at a constant value; this can reduce a loss of electric power in the boosting circuit in the semiconductor device and expand a range of operable distance.

Embodiment Mode 2

In this embodiment mode, an example of fabricating a transistor included in the semiconductor device described in any of the above embodiment modes is described. In this embodiment mode, a mode is particularly described in which a semiconductor device is provided with a transistor fabricated using a semiconductor film formed over an insulating substrate is formed.

Figure 10A:
FIGS. 10A to 10D are diagrams for describing Embodiment Mode 2.

First, a release layer 1902 is formed on one surface of a substrate 1901, and then an insulating film 1903 to be a base and an amorphous semiconductor film 1904 (for example, a film containing amorphous silicon) are formed (FIG. 10A). The release layer 1902, the insulating film 1903, and the amorphous semiconductor film 1904 can be successively formed. Being formed successively, they are not exposed to the air and thus mixture of an impurity can be prevented.

As the substrate 1901, a glass substrate, a quartz substrate, a metal substrate, a stainless steel substrate, a plastic substrate which has heat resistance to a process temperature in the process, or the like is preferably used. Such a substrate has no significant limitation on its area or its shape. Thus, for example, in a case of using a substrate which is a rectangular shape having a side length of 1 meter or longer, productivity can be significantly increased. Such a merit is greatly advantageous as compared to a case of using a circular silicon substrate. Therefore, even in a case of forming an integrated circuit portion or an antenna larger, the cost can be low as compared to the case of using a silicon substrate.

Note that while the release layer 1902 is formed over an entire surface of the substrate 1901 in this process, the release layer 1902 may be selectively formed as necessary by a photolithography method after a release layer is formed over an entire surface of the substrate 1901. Further, while the release layer 1902 is formed so as to be in contact with the substrate 1901, it is also allowed that an insulating film such as a silicon oxide ($SiO_x$) film, a silicon oxynitride ($SiO_xN_y$) (x>y) film, a silicon nitride ($SiN_x$) film, or a silicon nitride oxide ($SiN_xO_y$) (x>y) film is formed and the release layer 1902 is formed so as to be in contact with the insulating film, as necessary.

As the release layer 1902, a metal film, a layered structure of a metal film and a metal oxide film, or the like can be used. The metal film is formed to have a single-layer structure or a layered structure of a film formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), or iridium (Ir), or an alloy material or a compound material including any of the above elements as its main component. The metal film can be formed by a sputtering method, various CVD methods such as a plasma CVD method, or the like. As the layered structure of a metal film and a metal oxide film, after the above metal film is formed, an oxide or oxynitride of the metal film can be formed on the surface of the metal film by performing plasma treatment in an oxygen atmosphere or an $N_2O$ atmosphere, or heat treatment in an oxygen atmosphere or an $N_2O$ atmosphere. Alternatively, a metal film is formed and then a surface thereof is treated with a highly oxidative solution such as an ozone solution, so that an oxide or oxynitride of the metal film can be formed on the surface of the metal film.

The insulating film 1903 is formed to have a single-layer structure or a layered structure of a film containing oxide of silicon or nitride of silicon by a sputtering method, a plasma CVD method, or the like. In the case where the insulating film to be a base has a two-layer structure, a silicon nitride oxide film may be formed for a first layer, and a silicon oxynitride film may be formed for a second layer, for example. In the case where the insulating film to be a base has a three-layer structure, a silicon oxide film, a silicon nitride oxide film, and a silicon oxynitride film may be formed for a first layer, a second layer, and a third layer, respectively. Alternatively, a silicon oxynitride film, a silicon nitride oxide film, and a silicon oxynitride film may be formed for a first layer, a second layer, and a third layer, respectively. The insulating film to be a base functions as a blocking film for preventing impurities from entering from the substrate 1901.

The semiconductor film 1904 is formed to a thickness of from 25 to 200 nm (preferably, from 30 to 150 nm) by a sputtering method, an LPCVD method, a plasma CVD method, or the like. As the semiconductor film 1904, an amorphous silicon film may be formed, for example.

Figure 10B:
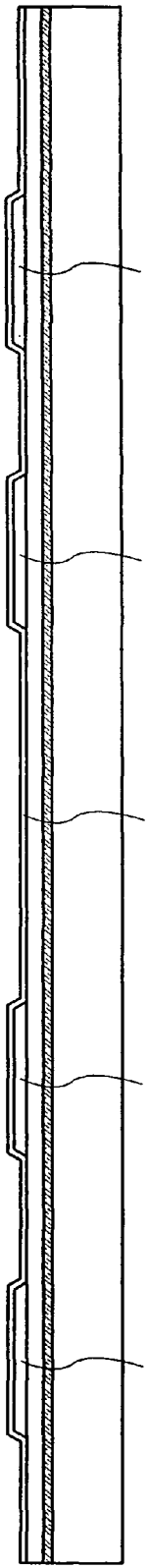

Next, the amorphous semiconductor film 1904 is crystallized by laser light irradiation. Note that the amorphous semiconductor film 1904 may be crystallized by a method in which laser light irradiation is combined with a thermal crystallization method using an RTA or an annealing furnace, or a thermal crystallization method using a metal element for promoting crystallization, or the like. After that, the obtained crystalline semiconductor film is etched so as to have a desired shape, so that semiconductor films 1904a to 1904d are formed. Then, a gate insulating film 1905 is formed so as to cover the semiconductor films 1904a to 1904d (see FIG. 10B).

An example of a manufacturing step of the semiconductor films 1904a to 1904d is briefly described below. First, an amorphous semiconductor film (for example, an amorphous silicon film) with a thickness of from 50 to 60 nm is formed by a plasma CVD method. Next, a solution containing nickel that is a metal element for promoting crystallization is retained on the amorphous semiconductor film, and a dehydrogenation treatment (at 500° C., for one hour) and a thermal crystallization treatment (at 550° C., for four hours) are performed on the amorphous semiconductor film, so that a crystalline semiconductor film is formed. After that, the crystalline semiconductor film is irradiated with laser light from a laser oscillator, and a photolithography method is used, so that the semiconductor films 1904a to 1904d are formed. Note that without being subjected to the thermal crystallization which uses the metal element for promoting crystallization, the amorphous semiconductor film may be crystallized only by laser light irradiation.

As a laser oscillator, a continuous wave laser beam (a CW laser beam) or a pulsed wave laser beam (a pulsed laser beam) can be used. As a laser beam which can be used here, a laser beam emitted from one or more of the following can be used: a gas laser such as an Ar laser, a Kr laser, or an excimer laser; a laser of which medium is single crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$, added with one or more of Nd, Yb, Cr, Ti, Ho, Er, Tm, and Ta as a dopant; a glass laser; a ruby laser; an alexandrite laser; a Ti:sapphire laser; a copper vapor laser; and a gold vapor laser. It is possible to obtain crystals with a large grain size when fundamental waves of such laser beams or second to fourth harmonics of the fundamental waves are used. For example, the second harmonic (532 nm) or the third harmonic (355 nm) of an $Nd:YVO_4$ laser (fundamental wave of 1064 nm) can be used. In this case, a power density of approximately 0.01 to 100 MW/cm$^2$ (preferably, 0.1 to 10 MW/cm$^2$) is necessary. Irradiation is conducted at a scanning rate of approximately 10 to 2000 cm/sec. It is to be noted that, a laser using, as a medium, single crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$ added with one or more of Nd, Yb, Cr, Ti, Ho, Er, Tm, and Ta as a dopant; an Ar ion laser; or a Ti:sapphire laser can be continuously oscillated. Furthermore, pulse oscillation thereof can be performed at a repetition rate of 10 MHz or more by carrying out Q switch operation, mode locking, or the like. In a case where a laser beam is oscillated at a repetition rate of higher than or equal to 10 MHz, after a semiconductor film is melted by a laser and before it is solidified, the semiconductor film is irradiated with a next pulse. Therefore, unlike a case of using a pulsed laser with a low repetition rate, a solid-liquid interface can be continuously moved in the semiconductor film, so that crystal grains which continuously grow in a scanning direction can be obtained.

Next, a gate insulating film 1905 which covers the semiconductor films 1904a to 1904d is formed. The gate insulating film 1905 is formed to have a single-layer structure or a layered structure of a film containing oxide of silicon or nitride of silicon by a CVD method, a sputtering method, or the like. In specific, the gate insulating film 1905 is formed to have a single-layer structure or a layered structure of a silicon oxide film, a silicon oxinitride film, or a silicon nitride oxide film.

Alternatively, the gate insulating film 1905 may be formed by performing a high-density plasma treatment on the amorphous semiconductor films 1904a to 1904d to oxidize or nitride the surfaces thereof. For example, the gate insulating film 1905 is formed by a plasma treatment introducing a mixed gas of a rare gas such as He, Ar, Kr, or Xe and oxygen, nitrogen oxide ($NO_2$), ammonia, nitrogen, hydrogen, or the like. When excitation of the plasma in this case is performed by introduction of a microwave, plasma with a low electron temperature and high density can be generated. By an oxygen radical (there is a case where an OH radical is included) or a nitrogen radical (there is a case where an NH radical is included) generated by this high-density plasma, the surfaces of the semiconductor films can be oxidized or nitrided.

By treatment using such high-density plasma, an insulating film with a thickness of from 1 to 20 nm, typically from 5 to 10 nm, is formed over the semiconductor film. Since the reaction of this case is a solid-phase reaction, interface state density between the insulating film and the semiconductor film can be extremely low. Since such high-density plasma treatment oxidizes (or nitrides) a semiconductor film (crystalline silicon, or polycrystalline silicon) directly, unevenness of a thickness of the insulating film to be formed can be extremely small, ideally. In addition, oxidation is not strengthened even in a crystal grain boundary of crystalline silicon, which makes a very preferable condition. That is, by a solid-phase oxidation of the surface of the semiconductor film by the high-density plasma treatment shown here, an insulating film with good uniformity and low interface state density can be formed without abnormal oxidation reaction in a crystal grain boundary.

As the gate insulating film 1905, an insulating film formed by the high-density plasma treatment may be used by itself, or an insulating film of silicon oxide, silicon oxynitride, silicon nitride, or the like may be formed thereover by a CVD method using plasma or thermal reaction, so as to make a stacked layer. In any case, transistors each including an insulating film formed by high-density plasma, in part of the gate insulating film or in the whole gate insulating film, can reduce variation in the characteristics.

Furthermore, a semiconductor film is irradiated with a continuous wave laser light or a laser light oscillated at a repetition rate of higher than or equal to 10 MHz and is scanned in one direction for crystallization, so that each of the semiconductor films 1904a to 1904d which has a characteristic that the crystal grows in the scanning direction of the laser light is obtained. When transistors are provided so that the scanning direction is aligned with the channel length direction (a direction in which carriers flow when a channel formation region is formed) and the above gate insulating layer is used, thin film transistors (TFTs) with less characteristic variation and high field effect mobility can be obtained.

Next, a first conductive film and a second conductive film are stacked over the gate insulating film 1905. Here, the first conductive film is formed to a thickness of from 20 to 100 nm by a plasma CVD method, a sputtering method, or the like, and the second conductive film is formed to a thickness of from 100 to 400 nm. The first conductive film and the second conductive film are formed using an element selected from tantalum (Ta), tungsten (W), titanium (Ti), molybdenum (Mo), aluminum (Al), copper (Cu), chromium (Cr), niobium (Nb), and the like, or an alloy material or a compound material containing the above elements as its main component. Alternatively, they are formed using a semiconductor material typified by polycrystalline silicon doped with an impurity element such as phosphorus. As examples of a combination of the first conductive film and the second conductive film, a tantalum nitride film and a tungsten film, a tungsten nitride film and a tungsten film, a molybdenum nitride film and a molybdenum film, and the like can be given. Since tungsten and tantalum nitride have high heat resistance, heat treatment for thermal activation can be performed after the first conductive film and the second conductive film are formed. In addition, in a case of a three-layer structure instead of a two-layer structure, a layered structure of a molybdenum film, an aluminum film, and a molybdenum film is preferably employed.

Next, a resist mask is formed by a photolithography method, and etching treatment for forming a gate electrode and a gate wiring is performed, so that gate electrodes 1907 are formed over the semiconductor films 1904a to 1904d.

Next, a resist mask is formed by a photolithography method, and an impurity element imparting n-type conductivity is added to the semiconductor films 1904a to 1904d at low concentration by an ion doping method or an ion implantation method. As an impurity element imparting n-type conductivity, an element which belongs to Group 15 may be used. For example, phosphorus (P) or arsenic (As) is used.

Next, an insulating film is formed so as to cover the gate insulating film 1905 and the gate electrodes 1907. The insulating film is formed to have a single-layer structure or a layered structure of a film including an inorganic material such as silicon, an oxide of silicon, or a nitride of silicon, and an organic material such as an organic resin, by a plasma CVD method, a sputtering method, or the like. Next, the insulating film is selectively etched by anisotropic etching for mainly etching in a perpendicular direction, so that insulating films 1908 (also referred to as side walls) which are in contact with side surfaces of the gate electrodes 1907 are formed. The insulating films 1908 are used as masks for doping when LDD (lightly doped drain) regions are formed later.

Figure 10C:
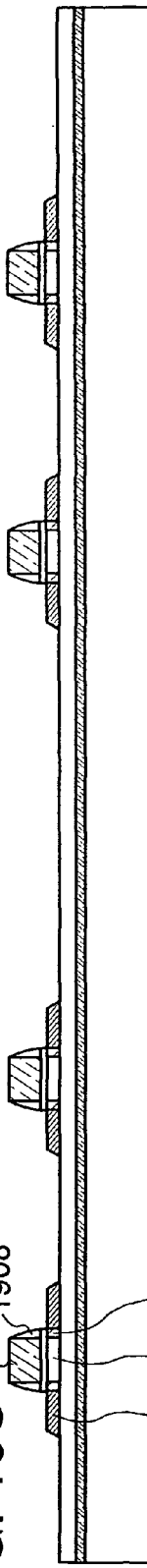

Next, a resist mask formed by a photolithography method, the gate electrodes 1907, and the insulating films 1908 are used as masks to add an impurity element imparting n-type conductivity to the semiconductor films 1904a to 1904d, so that channel formation regions 1906a, first impurity regions 1906b, and second impurity regions 1906c are formed (see FIG. 10C). The first impurity regions 1906b function as source and drain regions of the thin film transistor, and the second impurity regions 1906c function as LDD regions. The concentration of impurity elements contained in the second impurity regions 1906c is lower than that of impurity elements contained in the first impurity regions 1906b.

Figure 10D:
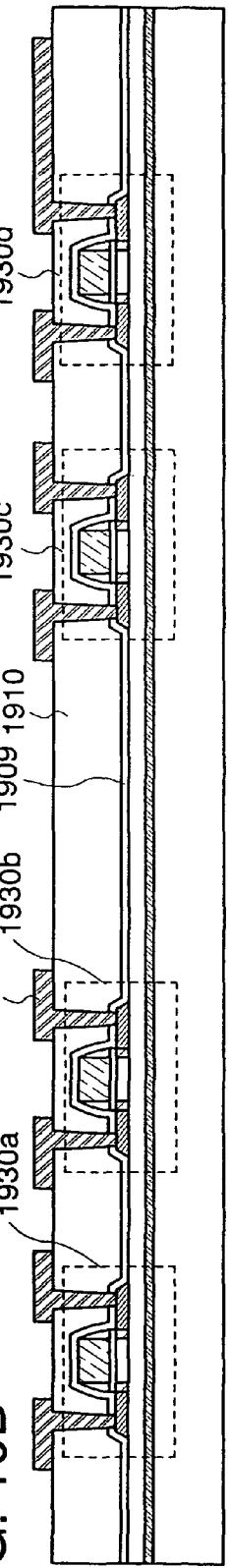

Next, an insulating film is formed as a single layer or a stacked layer so as to cover the gate electrodes 1907, the insulating films 1908, and the like, and conductive films 1931 which function as source and drain electrodes of the thin film transistor are formed over the insulating film. Consequently, thin film transistors 1930a to 1930d are obtained (FIG. 10D).

The insulating film is formed as a single layer or a stacked layer using an inorganic material such as an oxide of silicon or a nitride of silicon, an organic material such as polyimide, polyamide, benzocyclobutene, acrylic, or epoxy, a siloxane material, or the like, by a CVD method, a sputtering method, an SOG method, a droplet discharging method, a screen printing method, or the like. Here, the insulating film is formed to have a two-layer structure. A silicon nitride oxide film is formed as a first insulating film 1909, and a silicon oxynitride film is formed as a second insulating film 1910.

It is to be noted that before the insulating films 1909 and 1910 are formed or after either one or both the insulating films 1909 and 1910 are formed, heat treatment for recovering the crystallinity of the semiconductor films 1904a to 1904d, for activating the impurity element which has been added to the semiconductor film, or for hydrogenating the semiconductor film is preferably performed. For the heat treatment, thermal annealing, a laser annealing method, an RTA method, or the like is preferably employed.

The conductive films 1931 are formed in the following manner. The insulating films 1909 and 1910, and the like are etched by a photolithography method, and contact holes are formed to expose the first impurity regions 1906b. Then, a conductive film is formed so as to fill the contact holes and the conductive film is selectively etched so as to form the conductive films 1931. It is to be noted that before formation of the conductive film, a silicide may be formed over the surfaces of the semiconductor films 1904a to 1904d exposed in the contact holes.

The conductive film 1931 is formed by a CVD method, a sputtering method, or the like to have a single-layer structure or a layered structure with the use of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing any of the above elements as its main component. An alloy material containing aluminum as its main component corresponds to a material which contains aluminum as its main component and also contains nickel, or an alloy material which contains aluminum as its main component and also contains nickel and one or both of carbon and silicon, for example. The conductive film 1931 may employ, for example, a layered structure of a barrier film, an aluminum-silicon (Al—Si) film, and a barrier film, or a layered structure of a barrier film, an aluminum-silicon (Al—Si) film, a titanium nitride film, and a barrier film. It is to be noted that a barrier film corresponds to a thin film formed by using titanium, a nitride of titanium, molybdenum, or a nitride of molybdenum. Aluminum and aluminum silicon which have low resistance and are inexpensive are optimal materials for forming the conductive film 1931. In addition, generation of a hillock of aluminum or aluminum silicon can be prevented when upper and lower barrier layers are formed. Furthermore, when the barrier film is formed by using titanium that is a highly-reducible element, even if a thin natural oxide film is formed over the crystalline semiconductor film, the natural oxide film can be reduced so that favorable contact with the crystalline semiconductor film can be obtained.

Figure 11A:
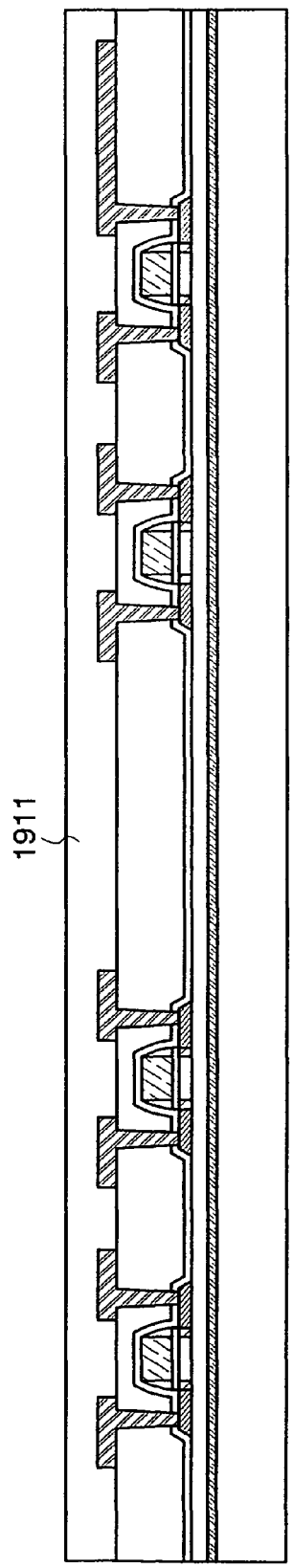
FIGS. 11A and 11B are diagrams for describing Embodiment Mode 2.

Next, an insulating film 1911 is formed so as to cover the conductive films 1931 (FIG. 11A). The insulating film 1911 is formed to have a single-layer structure or a layered structure by using an inorganic material or an organic material by a CVD method, a sputtering method, an SOG method, a droplet discharging method, a screen printing method, or the like. The insulating film 1911 is preferably formed to a thickness of 0.75 to 3 μm.

Figure 11B:
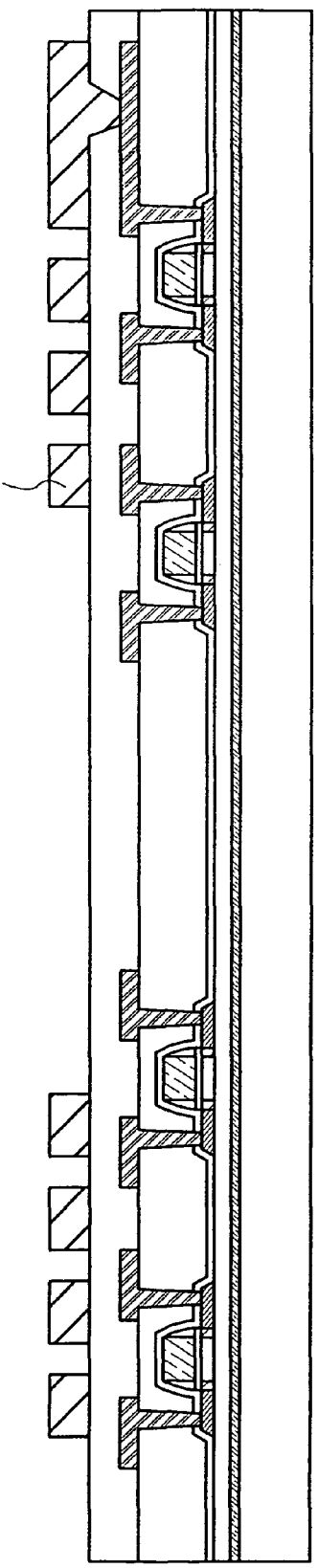

Next, a conductive film 1912 which functions as an antenna is selectively formed on a surface of the insulating film 1911 (FIG. 11B).

The conductive film 1912 is formed in the following manner. After the insulating film 1911 is etched by a photolithography method to form a contact hole which exposes the conductive film 1931, a conductive film is formed so as to fill the contact hole and the conductive film is selectively etched.

Further, the conductive film 1912 may be formed using a conductive material by a CVD method, a sputtering method, a printing method such as screen printing or gravure printing, a plating process, or the like. The conductive material is formed to have a single-layer structure or a layered structure with the use of an element selected from aluminum (Al), titanium (Ti), silver (Ag), copper (Cu), gold (Au), platinum (Pt), nickel (Ni), palladium (Pd), tantalum (Ta), or molybdenum (Mo), or an alloy material or a compound material containing any of the above-described elements as its main component.

For example, in a case of forming the conductive film 1912 functioning as an antenna by a screen printing method, the conductive films can be formed by being selectively printed with conductive paste in which conductive particles each having a grain size of from several nm to several tens of μm are dissolved or dispersed in an organic resin. As the conductive particle, a fine particle or a dispersive nanoparticle of one or more metals of silver (Ag), gold (Au), copper (Cu), nickel (Ni), platinum (Pt), palladium (Pd), tantalum (Ta), molybdenum (Mo), and titanium (Ti) or silver halide can be used. By using a screen printing method, a process can be simplified and cost reduction can be achieved.

Figure 12A:
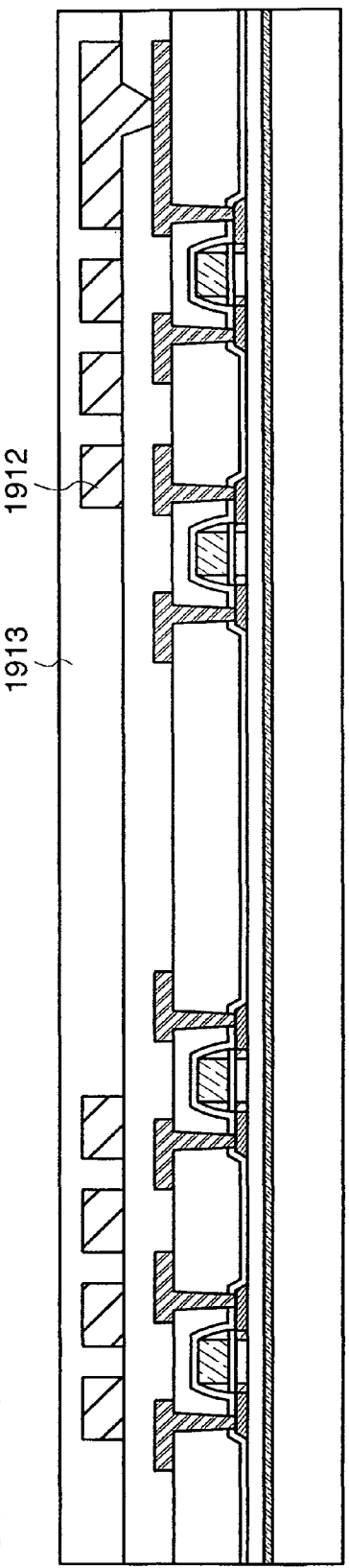
FIGS. 12A and 12B are diagrams for describing Embodiment Mode 2.

Next, an insulating film 1913 is formed so as to cover the conductive film 1912 functioning as an antenna (FIG. 12A).

The insulating film 1913 is formed having a single-layer structure of an inorganic material such as an oxide of silicon or a nitride of silicon (for example, a silicon oxide film, a silicon oxynitride film, a silicon nitride film, or a silicon nitride oxide film); or an organic material such as polyimide, polyamide, benzocyclobutene, acrylic, or epoxy; a siloxane material; or the like or a layered structure of any of the above by a CVD method, a sputtering method, an SOG method, a droplet discharging method, a screen printing method, or the like.

Next, an element formation layer including the thin film transistors 1930a to 1930d and the conductive film 1912 which functions as an antenna, and the like is separated from the substrate 1901.

Figure 12B:
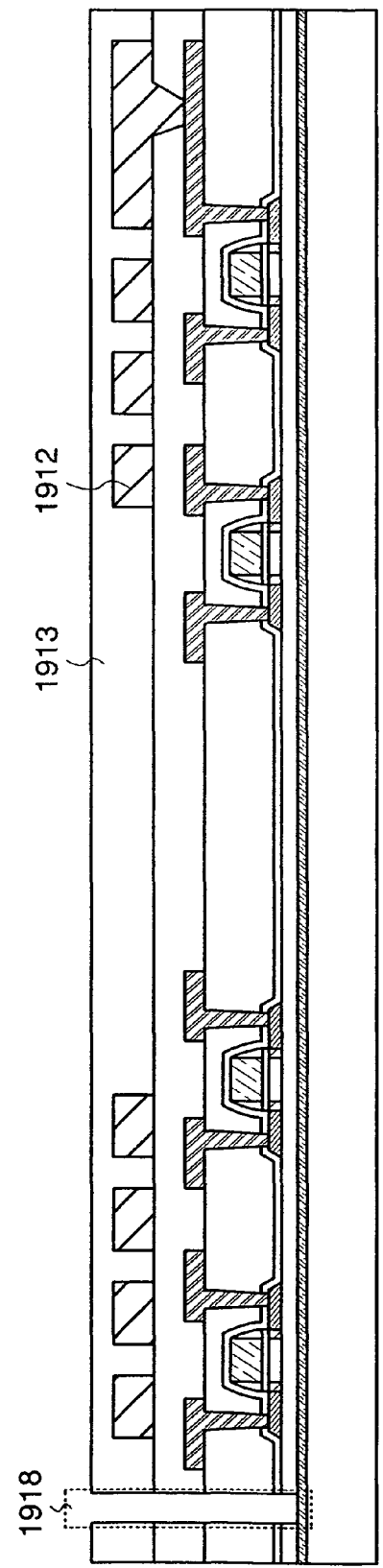

First, an opening 1918 is formed by laser light irradiation (FIG. 12B). After that, one surface (here, a surface of the insulating film 1917) of the element formation layer is attached to a first sheet material 1920, and then the element formation layer is separated from the substrate 1901 by a physical force (FIG. 13A). As the first sheet material 1920, a hot-melt film or the like can be used. In the case of separating the first sheet material 1920 later, a heat separation tape of which adhesion is reduced by being heated can be used.

Note that separation is performed with a surface to be separated getting wet with water or a solution such as ozone water, so that elements such as the thin film transistors 1930a to 1930d can be prevented from being damaged by static electricity or the like. Further, by reusing of the substrate 1901 from which the element formation layer is separated, the cost can be reduced.

Next, a second sheet material 1921 is formed on the other surface of the element formation layer (a surface exposed by separation from the substrate 1901) (FIG. 13B). The second sheet material 1921 can be attached to the other surface of the element formation layer by either one or both a heat treatment and a pressure treatment using a hot-melt film or the like. In the case of using a heat separation tape for the first sheet material 1920, separation can be performed utilizing heat applied at the time of attaching the second sheet material 1921.

Next, the element formation layer provided over the second sheet material 1921 is selectively cut by dicing, scribing, a laser cutting method, or the like and thus, a plurality of semiconductor devices can be obtained. By using a flexible substrate such as a plastic substrate for the second sheet material 1921, a flexible semiconductor device can be formed.

Although this embodiment mode shows the case where an element such as a thin film transistor or an antenna is formed over the substrate 1901 and then separated from the substrate 1901 so that a flexible semiconductor device is formed, the present invention is not limited to this. Alternatively, a semiconductor device in which an element such as a thin film transistor or an antenna is formed over the substrate 1901 may be formed by, for example, applying the process in FIG. 13A and FIG. 10A without providing the release layer 1902 over the substrate 1901.

Note that in this embodiment mode, an example in which an antenna and a semiconductor element are formed over one substrate is described; however, the present invention is not limited thereto. After formation of the semiconductor element, an antenna which is separately formed may be electrically connected to an integrated circuit. In this case, the antenna and the integrated circuit can be electrically connected to each other by being pressure-bonded with an anisotropic conductive film (ACF), anisotropic conductive paste (ACP), or the like. Alternatively, a conductive adhesive such as a silver paste, a copper paste, or a carbon paste; solder joint; or the like may be used for the connection.

Note that this embodiment mode can be implemented in combination with any of technical elements of the other embodiment modes in this specification.

Embodiment Mode 3

In this embodiment mode, an example of fabricating a transistor included in the semiconductor device which is different from that described in Embodiment Mode 2 will be described. In this embodiment mode, a mode is particularly described in which a transistor included in the semiconductor device is formed using a single crystal silicon with reference to FIGS. 14A and 14B and FIG. 15.

Figure 14A:
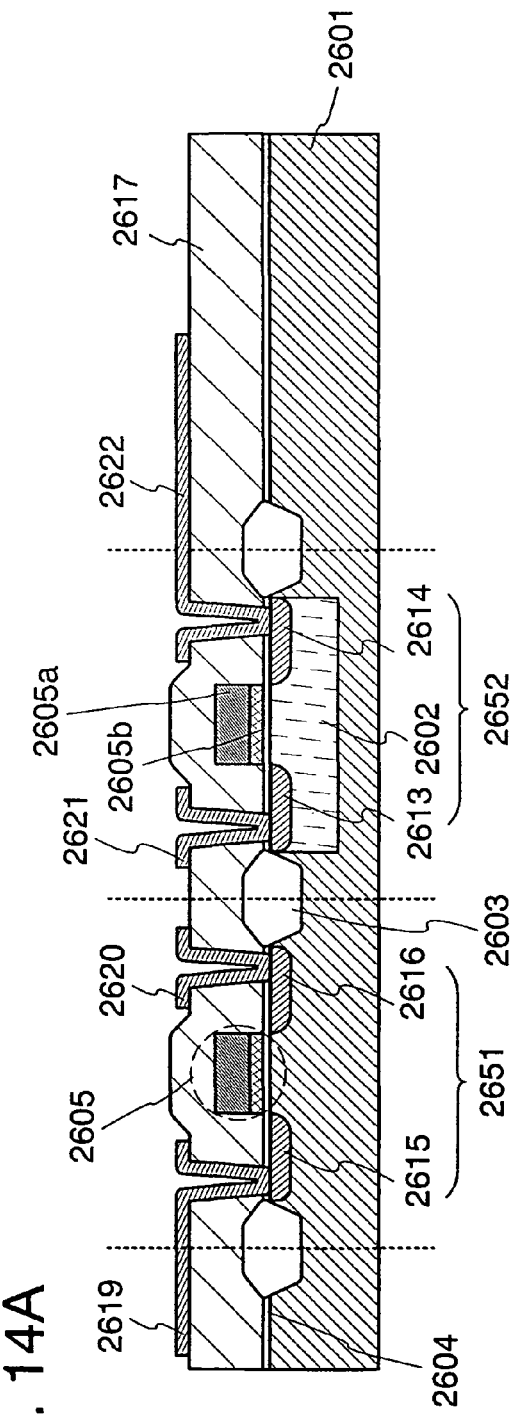
FIGS. 14A and 14B are diagrams for describing Embodiment Mode 3.

First, a fabrication process of a transistor is described with reference to FIG. 14A. A silicon substrate 2601 made of single-crystal silicon is prepared. Then, a p-well 2602 is selectively formed in an element formation region in a main surface (an element formation surface or a circuit formation surface) of the n-type silicon substrate 2601. Further, the silicon substrate 2601 can be made thinner by, for example, polishing the back surface thereof. By making the silicon substrate 2601 thinner in advance, a lightweight and thin semiconductor device can be formed.

Next, a field oxide film 2603 to be an element isolation region for partitioning the first element formation region and the second element formation region is formed. The field oxide film 2603 is a thick thermal oxide film and may be formed by a known LOCOS (local oxidation of silicon) method. Note that the method for partitioning the element formation regions is not limited to the LOCOS method. For example, by using a trench isolation method, the element isolation region may be formed to have a trench structure, or a combination of a LOCOS structure and a trench structure.

Next, a gate insulating film 2604 is formed by, for example, thermally oxidizing the surface of the silicon substrate. The gate insulating film 2604 may be formed by a CVD method; and a silicon oxynitride film, a silicon oxide film, a silicon nitride film, or a stack thereof can be used.

Next, layered films of polysilicon layers 2605a and silicide layers 2605b are formed over the entire surface. By forming the layered films by lithography and dry etching, gate electrodes 2605 each having a polycide structure are formed over the gate insulating film. In order to reduce resistance, the polysilicon layers 2605a may be doped with phosphorus (P) at a concentration of approximately $10^{21}/cm^3$ in advance, or alternatively, an n-type impurity may be diffused into the polysilicon layers 2605a at a high concentration after forming a polysilicon film. Further, the silicide layers 2605b can be formed of a material such as molybdenum silicide ($MoSi_x$), tungsten silicide ($WSi_x$), tantalum siliside ($TaSi_x$), or titanium silicide ($TiSi_x$) by a known method.

Note that sidewalls are formed on the side walls of the gate electrodes. For example, an insulating material layer formed of silicon oxide may be deposited on the entire surface by a CVD method, and the insulating material layer may be etched back to form the sidewalls. At the etch back, the gate insulating film may be selectively removed in a self-aligned manner.

Next, the exposed silicon substrate is subjected to ion implantation, to form a source region and a drain region. The first element formation region for forming a p-channel FET is coated with a resist material, and arsenic (As) or phosphorus (P), which is an n-type impurity, is implanted into the silicon substrate to form a source region 2613 and a drain region 2614. In addition, the second element formation region for forming an n-channel FET is coated with a resist material, and boron (B), which is a p-type impurity, is implanted into the silicon substrate to form a source region 2615 and a drain region 2616.

Next, an activation treatment is performed in order to activate the ion-implanted impurities and to recover crystal defects in the silicon substrate, which are caused by the ion implantation.

After the activation, an interlayer insulating film, a metal wiring which functions as a source electrode or a drain electrode, and the like are formed. An interlayer insulating film 2617 is formed of a silicon oxide film, a silicon oxynitride film, or the like by a plasma CVD method or a low-pressure CVD method. Note that an interlayer insulating film of phosphosilicate glass (PSG), borosilicate glass (BSG), or phosphoborosilicate glass (PBSG) may be further formed thereover.

Metal electrodes 2619, 2621, 2620, and 2622 are formed after contact holes reaching the source regions and the drain regions of the respective FETs in the interlayer insulating film 2617 and the gate insulating film 2604 are formed. Aluminum, which is commonly used as a low resistance material, may be used for the metal electrodes 2019, 2021, 2020, and 2022. Alternatively, a layered structure of aluminum and titanium may be employed.

Note that the contact holes may be formed by electron beam direct writing lithography. In electron beam direct writing lithography, positive resist for electron beam lithography is formed on the entire surface of the interlayer insulating film 2617, and a portion irradiated with an electron beam is dissolved using a developing solution. Then, holes are opened in the resist of a position where the contact holes are to be formed, and dry etching is performed using the resist as a mask, so that predetermined positions in the interlayer insulating film 2617 and the gate insulating film 2604 can be etched to form the contact holes. Thus, a p-channel transistor 2651 and an n-channel transistor 2652 can be fabricated using a single crystal substrate (FIG. 14A).

Figure 14B:
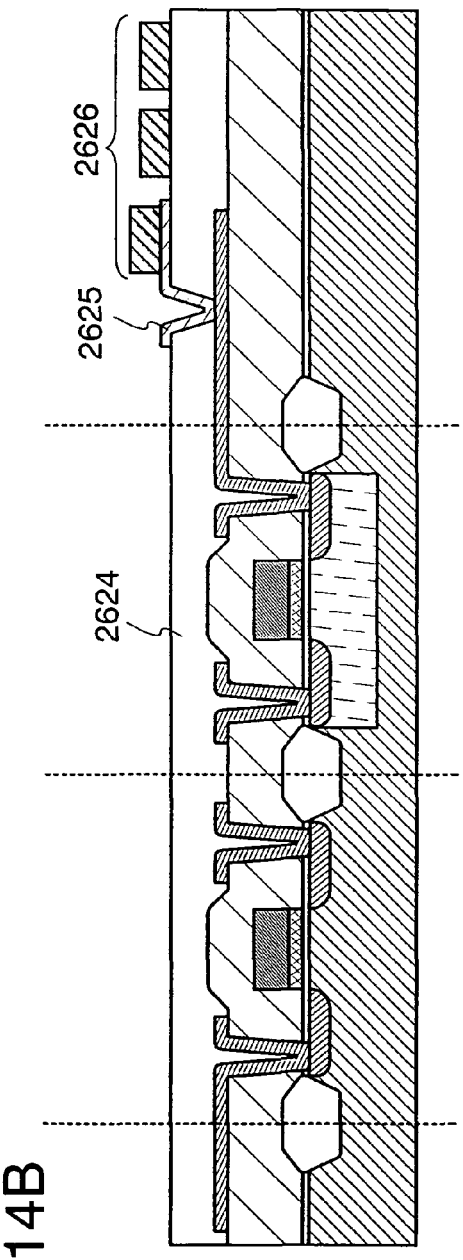

Next, as shown in FIG. 14B, an interlayer film 2624 is formed. Then, the interlayer film 2624 is etched to form a contact hole so that the metal electrode 2622 is partly exposed. The interlayer film 2624 is not limited to a resin and may be any other film such as a CVD oxidation film; however, the interlayer film 2624 is desirably a resin in terms of planarity. Alternatively, a contact hole may be formed using a photosensitive resin without the etching. After that, a wiring 2625 in contact with the metal electrode 2622 through the contact hole is formed over the interlayer film 2624.

Next, a conductive film 2626 functioning as an antenna is formed so as to contact with the wiring 2625. The conductive film 2626 can be formed using a metal such as silver (Ag), gold (Au), copper (Cu), palladium (Pd), chromium (Cr), platinum (Pt), molybdenum (Mo), titanium (Ti), tantalum (Ta), tungsten (W), aluminum (Al), iron (Fe), cobalt (Co), Zinc (Zn), Tin (Sn), or nickel (Ni). Alternatively, as the conductive film 2626, a film formed of an alloy containing any of the above metals as its main component or a film formed of a compound containing any of the above metals may be used. The conductive film 2626 can be formed to have a single-layer structure or layered structure of the above films.

The conductive films 2626 can be formed by a CVD method, a sputtering method, a printing method such as screen printing or gravure printing, a droplet discharging method, a dispenser method, a plating method, a photolithography method, an evaporation method, or the like.

Note that in this embodiment mode, an example in which an antenna and a semiconductor element are formed over one substrate is described; however, the present invention is not limited thereto. After formation of the semiconductor element, an antenna which is separately formed may be electrically connected to an integrated circuit. In this case, the antenna and the integrated circuit can be electrically connected to each other by being pressure-bonded with an anisotropic conductive film (ACF), anisotropic conductive paste (ACP), or the like. Alternatively, a conductive adhesive such as a silver paste, a copper paste, or a carbon paste; solder joint; or the like may be used for the connection.

Figure 15:
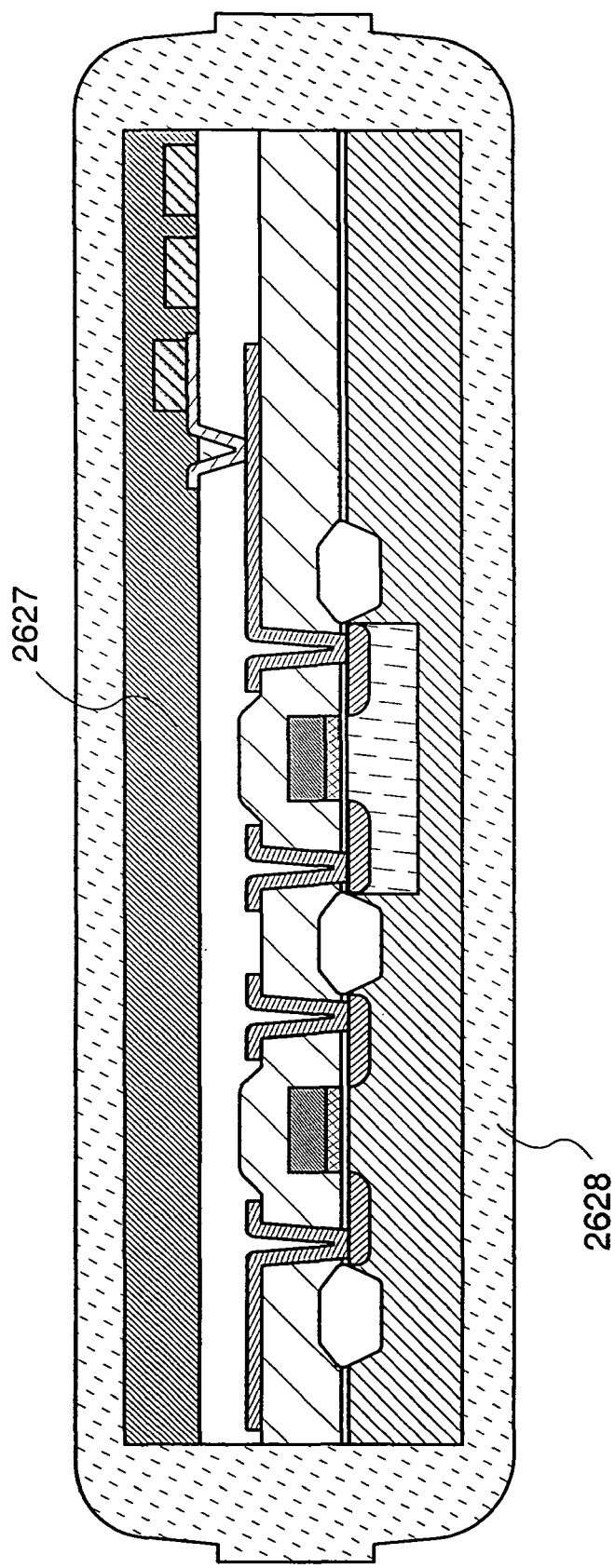
FIG. 15 is a diagram for describing Embodiment Mode 3.

Next, as shown in FIG. 15, a protective film 2627 is formed so as to cover the conductive film 2626 which functions as an antenna. The protective film 2627 is formed of a silicon nitride film, a silicon oxide film, or a silicon nitride oxide film. Further, an organic resin film may be formed instead of the silicon nitride film or the like, or an organic resin film may be stacked over the protective film. As an organic resin material, polyimide, polyamide, acrylic, benzocyclobutene (BCB), or the like can be used. It is advantageous to use an organic resin film in that, for example, the method for forming the film is simple, parasitic capacitance can be reduced because of the low dielectric constant, and it is suitable for planarization. It is needless to say that an organic resin film other than the ones described above may be used alternatively.

Then, as shown in FIG. 15, a semiconductor device can be completed by being covered with films 2628. A protective film may be provided on a surface of the film 2628 to prevent penetration of moisture, oxygen, or the like. The protective film can be formed of oxide containing silicon or nitride containing silicon. Further, a pattern which is to be a booster antenna of the semiconductor device may be formed on the film.

A product which is reduced in size and weight can be provided by using such a semiconductor device formed over a single crystal substrate. Further, a semiconductor device which is reduced in size can be made by using such a semiconductor device, and a variation in transistor characteristics is small, which is preferable.

Note that this embodiment mode can be implemented in combination with any of technical elements of the other embodiment modes in this specification.

Embodiment Mode 4

In this embodiment mode, applications of the semiconductor device of this invention are described. The semiconductor device of this invention can be used as a so-called IC label, IC tag, or IC card provided in, for example, bills, coins, securities, bearer bonds, documents (such as driver's licenses or resident's cards), packaging containers (such as wrapping paper or bottles), storage media (such as DVD software or video tapes), vehicles (such as bicycles), personal belongings (such as bags or glasses), foods, plants, animals, human bodies, clothing, everyday articles, or tags on products such as an electronic appliances or on packs. The electronic devices include a liquid crystal display device, an EL display device, a television unit (also simply referred to as a TV, a TV receiver or a television receiver), a cellular phone, and the like.

Note that in this specification, "IC cards" mean cards which are formed by embedding a thin semiconductor integrated circuit (an IC chip) in a plastic card so as to store data. IC cards can be categorized as a "contact type" or a "non-contact type" depending on the method of reading/writing data. The non-contact type card is incorporated with an antenna, which can communicate with a terminal by utilization of weak radio waves. In addition, an IC tag refers to a small IC chip used for identification of objects, which stores data such as its own identification code, and is capable of transmitting and receiving data to/from a management system with radio waves. The IC tag having a size of several tens millimeters can communicate with a reader through radio waves or electromagnetic waves. An IC tag of this invention that is applied to a semiconductor device which wirelessly communicates data can be used in various applications such as card-form objects, labels (called IC labels), or certificates.

In this embodiment mode, an application of this invention and an example of an article provided with it will be described with reference to FIGS. 16A to 16E.

Figure 16A:
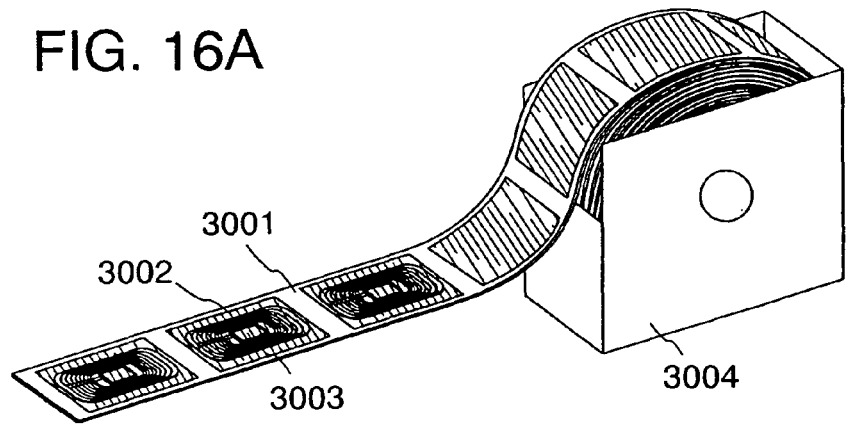
FIGS. 16A to 16E are diagrams for describing Embodiment Mode 4.

FIG. 16A shows an example of a state of completed products of a semiconductor device which is the semiconductor device of this invention. A plurality of IC labels 3003 each including a semiconductor device 3002 is formed on a label board (separate paper) 3001. Further, the IC label 3003 is stored in a box 3004. In addition, on the IC labels 3003, information on a commercial product or service (e.g., a name of the product, a brand, a trademark, a trademark owner, a seller, or a manufacturer) is written while an ID number which is specific to the commercial product (or the kind of the commercial product) is assigned to the incorporated semiconductor device, so that forgery, infringement of intellectual property rights such as a patent and a trademark, and illegality such as unfair competition can be easily figured out. Further, a lot of data which is too much to be written clearly on a container or a label of the product, for example, production area, selling area, quality, raw material, efficacy, use, quantity, shape, price, production method, directions for use, production time, time of the use, expiration date, instructions of the product, data on the intellectual property of the product, and the like can be inputted in the semiconductor device; therefore, a trader and a consumer can access the data with the use of a simple reader. Moreover, although information can also be rewritten, erased, or the like with the producer side, information cannot be rewritten, erased, or the like by the trader and the consumer sides.

Figure 16B:
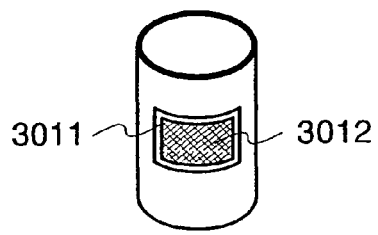

FIG. 16B shows an IC tag 3011 with a label form, in which a semiconductor device 3012 is incorporated. By attaching the IC tag 3011 to a product, management of the product becomes easier. For example, when the product is stolen, the criminal can be quickly recognized by tracing a path of the product. Thus, by providing the IC tag, products that are superior in so-called traceability can be distributed.

Figure 16C:
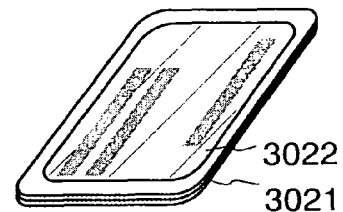

FIG. 16C shows an example of the state of a completed product of an IC card 3021 including a semiconductor device 3022 of this invention. The IC card 3021 may be any kind of card, including a cash card, a credit card, a prepaid card, an electronic ticket, electronic money, a telephone card, and a membership card.

Figure 16D:
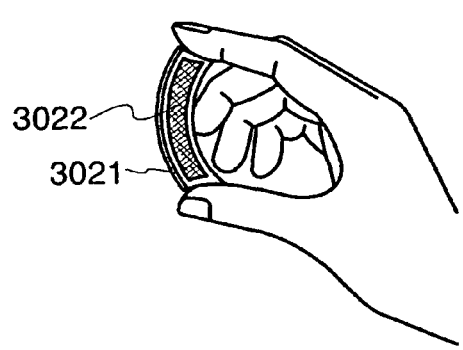

Note that in the case of an IC card shown in FIG. 16C, the IC card can be used even if transformed by being bent as shown in FIG. 16D by using a thin film transistor as a transistor included in the semiconductor device.

Figure 16E:
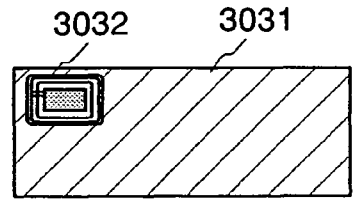

FIG. 16E shows a completed product of a bearer bond 3031. A semiconductor device 3032 is embedded in the bearer bond 3031 and is protected by a resin formed in the periphery thereof. The bearer bond 3031 can be formed in the same manner as the IC label, the IC tag, or the IC card of this invention. Note that examples of the aforementioned bearer bond include, but not limited to, stamps, tickets, admission tickets, merchandise coupons, book coupons, stationery coupons, beer coupons, rice coupons, various gift coupons, various service coupons, and the like. In addition, when the semiconductor device 3032 of this invention is provided in bills, coins, securities, bearer bonds, certificates, or the like, an authentication function can be provided. With the authentication function, forgery can be prevented.

In addition, although not shown here, the efficiency of a system such as an inspection system can be improved by provision of the semiconductor device of this invention in, for example, books, packaging containers, storage media, personal belongings, foods, clothing, everyday articles, electronic appliances, or the like. Further, the semiconductor device being provided for vehicles can prevent forgery or theft of the vehicles. By implanting the semiconductor devices in creatures such as animals, identification of the individual creature can be easily carried out. For example, when a wireless tag is implanted into creatures such as domestic animals, the year of birth, sex, breed and the like of them can be identified easily.

As set forth above, the semiconductor devices according to this invention can be provided to various kinds of goods (including creatures).

Note that this embodiment mode can be carried out in combination with a technical element in other embodiment modes in this specification. That is, a voltage value depending on the distance between the semiconductor device and the communication device can be controlled at a constant value; this can reduce a loss of electric power in the boosting circuit in the semiconductor device and expand a range of operable distance.

This application is based on Japanese Patent Application serial no. 2007-223644 filed with Japan Patent Office on Aug. 30, 2007, the entire contents of which are hereby incorporated by reference.

What is claimed is:

1. A semiconductor device comprising:
an antenna;
a first circuit electrically connected to the antenna, wherein the first circuit comprises a first charge pump, a second charge pump, a third charge pump, and a first switch disposed between the second charge pump and the third charge pump;
a second circuit configured to generate a reference voltage in accordance with a first output voltage supplied from the first charge pump; and
a third circuit configured to compare the reference voltage with a second output voltage supplied from the second charge pump to generate an output signal,
wherein the first switch is turned on or off in accordance with the output signal,
wherein an output terminal of the first charge pump is electrically connected to an input terminal of the second charge pump and the second circuit,
wherein an output terminal of the second charge pump is electrically connected to a first terminal of the first switch and the third circuit, and
wherein a second terminal of the first switch is electrically connected to an input terminal of the third charge pump.

2. The semiconductor device according to claim 1, wherein each of the second circuit and the third circuit includes at least a thin film transistor.

3. The semiconductor device according to claim 1, wherein the third circuit includes at least two comparators.

4. The semiconductor device according to claim 1, wherein the first switch includes a transistor.

5. A semiconductor device comprising:
an antenna;
a first circuit electrically connected to the antenna, wherein the first circuit comprises a first charge pump, a second charge pump, a third charge pump, and a first switch disposed between the second charge pump and the third charge pump;
a second circuit configured to generate a reference voltage in accordance with a first output voltage supplied from the first charge pump;
a third circuit configured to compare the reference voltage with a second output voltage supplied from the second charge pump to generate an output signal;
a second switch disposed between the first circuit and a logic circuit; and
a controller configured to control the second switch in accordance with the output signal,
wherein the first switch is turned on or off in accordance with the output signal,
wherein the antenna is electrically connected to a first input terminal of the first charge pump, a first input terminal of the second charge pump, and a first input terminal of the third charge pump,
wherein an output terminal of the first charge pump is electrically connected to a second input terminal of the second charge pump and the second circuit,
wherein an output terminal of the second charge pump is electrically connected to a first terminal of the first switch and the third circuit, and
wherein a second terminal of the first switch is electrically connected to a second input terminal of the third charge pump.

6. The semiconductor device according to claim 5, wherein each of the second circuit and the third circuit includes at least a thin film transistor.

7. The semiconductor device according to claim 5, wherein the third circuit includes at least two comparators.

8. The semiconductor device according to claim 5, wherein the first switch includes a transistor.

9. The semiconductor device according to claim 5, wherein the controller includes at least two Ex-OR circuits.

10. The semiconductor device according to claim 5, wherein the second switch includes a transistor.

11. A semiconductor device comprising:
an antenna;
a first circuit electrically connected to the antenna, wherein the first circuit comprises a first charge pump, a second charge pump, a third charge pump, a fourth charge pump, a first switch disposed between the second charge pump and the third charge pump, and a second switch disposed between the third charge pump and the fourth charge pump;
a second circuit configured to generate a reference voltage in accordance with a first output voltage supplied from the first charge pump;
a third circuit configured to compare the reference voltage with a second output voltage supplied from the second charge pump to generate an output signal;
a third switch disposed between the first circuit and a logic circuit; and
a controller configured to control the third switch in accordance with the output signal,
wherein the first switch is turned on or off in accordance with the output signal,
wherein each of the first charge pump, the second charge pump, the third charge pump, and the fourth charge pump comprises a diode and a capacitor element,
wherein the antenna is electrically connected to a first input terminal of the first charge pump, a first input terminal of the second charge pump, a first input terminal of the third charge pump, and a first input terminal of the fourth charge pump,
wherein an output terminal of the first charge pump is electrically connected to a second input terminal of the second charge pump and the second circuit,
wherein an output terminal of the second charge pump is electrically connected to a first terminal of the first switch and the third circuit,
wherein a second terminal of the first switch is electrically connected to a second input terminal of the third charge pump, and
wherein the first switch is turned on when the reference voltage is larger than the second output voltage.

12. The semiconductor device according to claim 11, wherein each of the second circuit and the third circuit includes at least a thin film transistor.

13. The semiconductor device according to claim 11, wherein the third circuit includes at least two comparators.

14. The semiconductor device according to claim 11, wherein the first switch includes a transistor.

15. The semiconductor device according to claim 11, wherein the controller includes at least two Ex-OR circuits.

16. The semiconductor device according to claim 11, wherein the second switch includes a transistor.

* * * * *